United States Patent
Obert et al.

(10) Patent No.: US 9,805,495 B2
(45) Date of Patent: Oct. 31, 2017

(54) SINGLE PASS BOUNDING VOLUME HIERARCHY RASTERIZATION

(71) Applicant: QUALCOMM Incorporated, San Diego, CA (US)

(72) Inventors: Juraj Obert, Orlando, FL (US); Tao Wang, Sunnyvale, CA (US); Vineet Goel, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/054,717

(22) Filed: Feb. 26, 2016

(65) Prior Publication Data
US 2017/0249771 A1 Aug. 31, 2017

(51) Int. Cl.
*G06T 15/00* (2011.01)
*G06T 15/06* (2011.01)

(52) U.S. Cl.
CPC ............ *G06T 15/005* (2013.01); *G06T 15/06* (2013.01); *G06T 2200/28* (2013.01); *G06T 2210/21* (2013.01)

(58) Field of Classification Search
CPC ........ G06T 17/005; G06T 17/20; G06T 15/10
USPC ......................................................... 345/419
See application file for complete search history.

(56) References Cited

U.S. PATENT DOCUMENTS

| | | | |
|---|---|---|---|
| 6,088,035 A * | 7/2000 | Sudarsky | ............... G06T 15/10 345/419 |
| 6,898,560 B1 | 5/2005 | Das | |
| 8,497,860 B2 * | 7/2013 | Lee | .................. G06T 17/20 345/420 |
| 2012/0038640 A1 | 2/2012 | Lee | |
| 2015/0302629 A1 | 10/2015 | Obert et al. | |

OTHER PUBLICATIONS

Yoon, Sung-Eui, Sean Curtis, and Dinesh Manocha. "Ray tracing dynamic scenes using selective restructuring." Proceedings of the 18th Eurographics conference on Rendering Techniques. Eurographics Association, 2007.*
Barczak, "An Improved Multi-Level Raytracing Algorithm," 2009, 6 pp. (Applicant points out, in accordance with MPEP 609.04(a), that the year of publication, 2009, is sufficiently earlier than the effective U.S. filing date, Feb. 26, 2016, so that the particular month of publication is not in issue.).

(Continued)

*Primary Examiner* — Phu K Nguyen
(74) *Attorney, Agent, or Firm* — Shumaker & Sieffert, P.A.

(57) ABSTRACT

A render output unit running on at least one processor may receive a source pixel value to be written to a pixel location in a render target, wherein the source pixel value is associated with a source node in a hierarchical structure. The render output unit may receive a destination pixel value of the pixel location in the render target, wherein the destination pixel value is associated with a destination node in the hierarchical structure. The render output unit may determine a lowest common ancestor node of the source node and the destination node in the hierarchical structure. The render output unit may output a resulting pixel value associated with the lowest common ancestor node of the source node and the destination node to the pixel location in the render target.

30 Claims, 10 Drawing Sheets

(56) References Cited

OTHER PUBLICATIONS

GeeksforGeeks: "Lowest Common Ancestor in a Binary Tree, Set 1," Retrieved dated on Oct. 12, 2015, Retrieved from the Internet URL: http://www.geeksforgeeks.org/lowestcommonancestor-binarytreeset1/ >, 25 pp.

Yoon, et al., "Ray Tracing Dynamic Scenes using Selective Restructuring," Eurographics Symposium on Rendering, Aug. 5-9, 2007, 12 pp.

International Search Report and Written Opinion—PCT/US2017/012307—ISA/EPO—dated Apr. 6, 2017.

\* cited by examiner

SINGLE PASS BOUNDING VOLUME HIERARCHY RASTERIZATION

TECHNICAL FIELD

This disclosure relates to graphics processing.

BACKGROUND

In computer graphics, ray tracing is the process of tracing three-dimensional (3D) rays through a 3D scene and finding ray-primitive intersections. In order to accelerate the process of finding ray-primitive intersections, a scene geometry is arranged in an acceleration data structure (ADS) that hierarchically groups scene primitives (e.g., triangles) into bounding volumes associated with nodes of the ADS. The ADS may be recursively traversed by performing ray intersection tests on the hierarchy of scene primitives to determine the primitives of the scene that are intersected by the ray.

SUMMARY

In one aspect, the disclosure is directed to a method for graphics processing. The method includes receiving, by at least one processor, a source pixel value to be written to a pixel location in a render target, wherein the source pixel value is associated with a source node in a hierarchical structure. The method further includes receiving, by the at least one processor, a destination pixel value of the pixel location in the render target, wherein the destination pixel value is associated with a destination node in the hierarchical structure. The method further includes determining, by the at least one processor, a lowest common ancestor node of the source node and the destination node in the hierarchical structure. The method further includes outputting, by the at least one processor, a resulting pixel value associated with the lowest common ancestor node of the source node and the destination node to the pixel location in the render target.

In another aspect, the disclosure is directed to an apparatus for processing graphics data. The apparatus includes a memory configured to store a render target. The apparatus further includes at least one processor configured to: receive a source pixel value to be written to a pixel location in the render target, wherein the source pixel value is associated with a source node in a hierarchical structure; receive a destination pixel value of the pixel location in the render target, wherein the destination pixel value is associated with a destination node in the hierarchical structure; determine a lowest common ancestor node of the source node and the destination node in the hierarchical structure; and output a resulting pixel value associated with the lowest common ancestor node of the source node and the destination node to the pixel location in the render target.

In another aspect, the disclosure is directed to an apparatus. The apparatus includes means for receiving a source pixel value to be written to a pixel location in a render target, wherein the source pixel value is associated with a source node in a hierarchical structure. The apparatus further includes means for receiving a destination pixel value of the pixel location in the render target, wherein the destination pixel value is associated with a destination node in the hierarchical structure. The apparatus further includes means for determining a lowest common ancestor node of the source node and the destination node in the hierarchical structure. The apparatus further includes means for outputting, by the render output unit of the processor, a resulting pixel value associated with the lowest common ancestor node of the source node and the destination node to the pixel location in the render target.

In another aspect, the disclosure is directed to a computer-readable storage medium storing instructions. The instructions, when executed, cause one or more programmable processor to: receive a source pixel value to be written to a pixel location in a render target, wherein the source pixel value is associated with a source node in a hierarchical structure; receive a destination pixel value of the pixel location in the render target, wherein the destination pixel value is associated with a destination node in the hierarchical structure; determine a lowest common ancestor node of the source node and the destination node in the hierarchical structure; and output a resulting pixel value associated with the lowest common ancestor node of the source node and the destination node to the pixel location in the render target.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
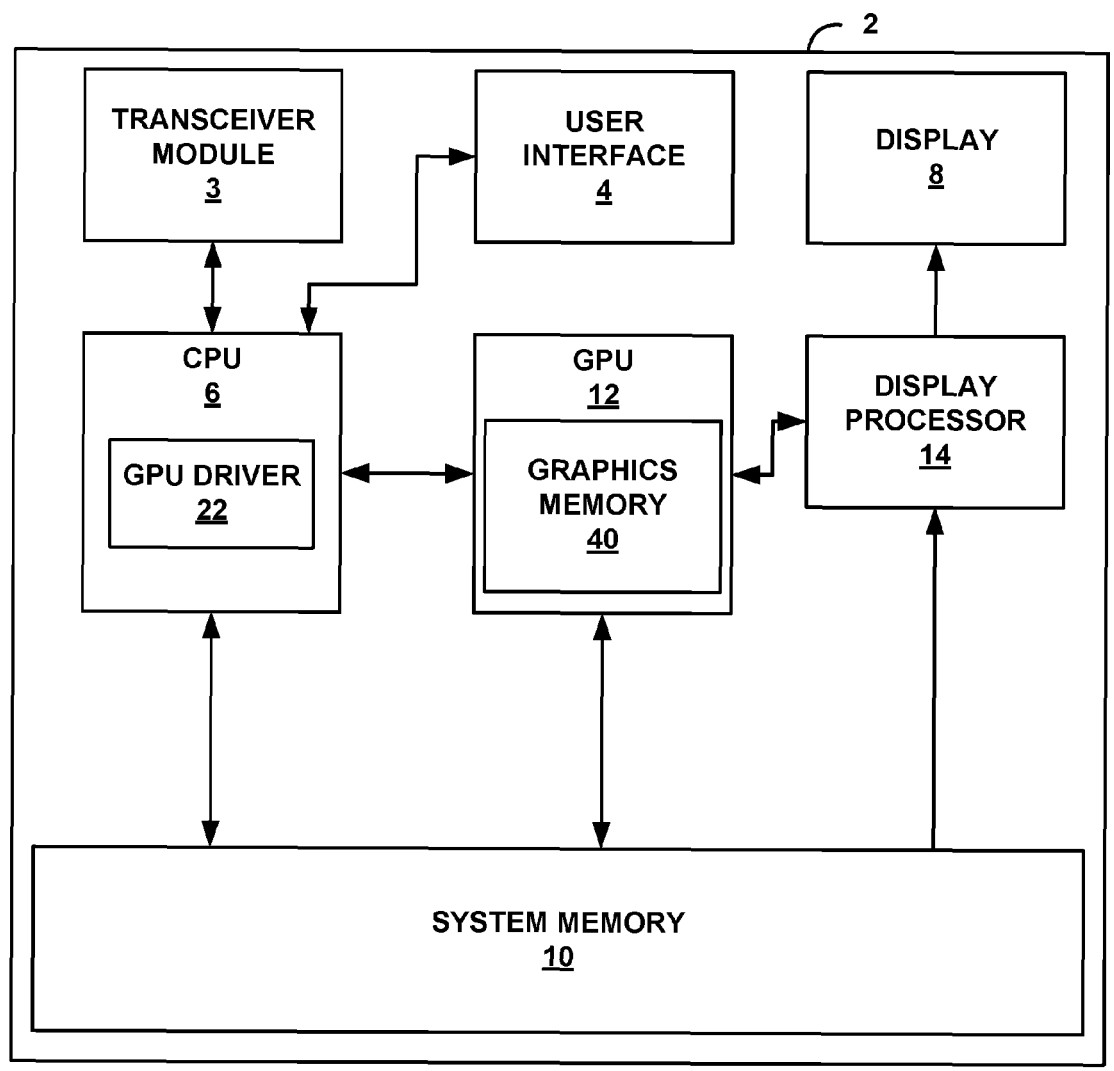
FIG. 1 is a block diagram illustrating an example computing device that may be configured to implement one or more aspects of this disclosure.

In general, this disclosure describes techniques for a GPU to more efficiently perform ray tracing for a graphics scene by determining which primitives in the graphics scene are intersected by rays that are cast within the graphics scene. A GPU may render an image that is a two-dimensional representation of a three-dimensional graphics scene. For each pixel in the finally rendered image, the GPU may cast a primary ray from a viewpoint through the pixel. The GPU may recursively traverse an ADS by performing ray intersection tests on the hierarchy of scene primitives to determine the primitives of the graphics scene that are intersected by a ray. In one example, if the GPU determines that a primitive in the graphics scene is intersected by a primary ray, the GPU may determine the pixel value of the pixel based on the primitive intersected by the primary ray.

Primitives of a graphics scene may be grouped into bounding volumes that may be associated with nodes of the ADS. To more efficiently traverse the ADS, a graphics processing unit (GPU) may determine an interior node from which to start traversal of the ADS to reduce the number of ray intersection tests that the GPU may perform on the ADS as compared to traversing the ADS starting from the root node. The GPU may rasterize representations of bounding volumes associated with nodes of the ADS to an off-screen render target. The GPU may determine, from a pixel value sampled from the off-screen render target, an associated interior node from which to start traversal of the ADS, thereby reducing the number of ray intersection tests a GPU may need to perform to traverse the ADS to determine one or more ray-primitive intersections.

To rasterize representations of the bounding volumes to off-screen render target, the GPU may associate a different color value with each of the nodes, and may perform a simplified version of a graphics processing pipeline rasterize representations of bounding volumes associated with the nodes by writing color values associated with the particular node to pixels of the off-screen render target. For each node, the GPU may rasterize a block of pixels having the same shape as the associated bounding volume to the off-screen render target by writing the same color value as associated with the node to the block of pixels.

For ray tracing, to determine whether a particular ray intersects with a particular primitive in the graphics scene, the GPU may map the ray to corresponding pixels in the off-screen render target, and may sample the color value of the pixel in the off-screen render target in which the ray intersects one or more of the representations of bounding volumes rasterized to the render target. Because each node of the ADS is associated with a unique color value different from the color values of other nodes in the ADS, the GPU may determine the node associated with the same color value as the color value sampled from the pixel, and may start traversal of the ADS from that node.

Portions of bounding volumes may, depending on the viewing angle, overlap, even between bounding volumes that are not associated with corresponding parent and child nodes of the ADS. Thus, portions of blocks of pixels rasterized to the off-screen render target may also overlap. If bounding volumes associated with two nodes of the ADS overlap each other, and if the two nodes do not have a parent-child relationship in the ADS (e.g., one bounding volume does not complete enclose the other bounding volume), the GPU may determine the lowest common ancestor node of the two nodes, where the lowest common ancestor node is the deepest node in the ADS that is the ancestor of (e.g., above the level of and connected to) the two nodes. The GPU may write the color value associated with the lowest common ancestor node to the pixels in the off-screen render target where representations of the bounding volumes associated with the two nodes overlap from the perspective of the camera viewing the scene. In these situations, if the GPU does not determine the lowest common ancestor node, then the GPU may write an incorrect color value to a pixel to the off-screen render target, and may cause itself to traverse the ADS from an incorrect node, thereby leading to errors in determining whether a ray intersects a primitive of the ADS.

To accelerate the rasterizing of the representations of the nodes to off-screen render target, the GPU may include a render output unit, also known as a raster operations pipeline (ROP), which may operate in a lowest common ancestor mode to take as inputs an indication of two nodes of the ADS and provide as outputs an indication of the lowest common ancestor node of the two nodes. In one example, the ROP may take as inputs a source color value that is to be written by a pixel shader running on the GPU to a pixel in the off-screen render target and a destination color value of the pixel in the off-screen render target the pixel shader is attempting to write to, and may output a resulting color value that is associated with the lowest common ancestor node of the two nodes associated with the input color value and the pixel color value. In this way, the GPU may be able to more efficiently and accurately rasterize representations of the nodes to off-screen render target.

FIG. 1 is a block diagram illustrating an example computing device that may be configured to implement one or more aspects of this disclosure. As shown in FIG. 1, device 2 may be a computing device including but not limited to video devices, media players, set-top boxes, wireless handsets such as mobile telephones and so-called smartphones, personal digital assistants (PDAs), desktop computers, laptop computers, gaming consoles, video conferencing units, tablet computing devices, and the like. In the example of FIG. 1, device 2 may include central processing unit (CPU) 6, system memory 10, and GPU 12. Device 2 may also include display processor 14, transceiver module 3, user interface 4, and display 8. Transceiver module 3 and display processor 14 may both be part of the same integrated circuit (IC) as CPU 6 and/or GPU 12, may both be external to the integrated circuit (IC) or ICs that include CPU 6 and/or GPU 12, or may be formed in the IC that is external to the IC that includes CPU 6 and/or GPU 12.

Device 2 may include additional modules or units not shown in FIG. 1 for purposes of clarity. For example, device 2 may include a speaker and a microphone, neither of which are shown in FIG. 1, to effectuate telephonic communications in examples where device 2 is a mobile wireless telephone, such as a so-called smartphone, or a speaker where device 2 is a media player. Device 2 may also include a video camera. Furthermore, the various modules and units shown in device 2 may not be necessary in every example of device 2. For example, user interface 4 and display 8 may be external to device 2 in examples where device 2 is a desktop computer or other device that is equipped to interface with an external user interface or display.

Examples of user interface 4 include, but are not limited to, a trackball, a mouse, a keyboard, and other types of input devices. User interface 4 may also be a touch screen and may be incorporated as a part of display 8. Transceiver module 3 may include circuitry to allow wireless or wired communication between device 2 and another device or a network. Transceiver module 3 may include modulators, demodulators, amplifiers and other such circuitry for wired or wireless communication.

CPU 6 may be a microprocessor, such as a central processing unit (CPU) configured to process instructions of a computer program for execution. CPU 6 may comprise a general-purpose or a special-purpose processor that controls operation of device 2. A user may provide input to device 2 to cause CPU 6 to execute one or more software applications. The software applications that execute on CPU 6 may include, for example, an operating system, a word processor application, an email application, a spreadsheet application, a media player application, a video game application, a graphical user interface application or another program. Additionally, CPU 6 may execute GPU driver 22 for controlling the operation of GPU 12. The user may provide input to device 2 via one or more input devices (not shown) such as a keyboard, a mouse, a microphone, a touch pad or another input device that is coupled to device 2 via user interface 4.

The software applications that execute on CPU 6 may include one or more graphics rendering instructions that instruct CPU 6 to cause the rendering of graphics data to display 8. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 (e.g., through GPU driver 22) to cause GPU 12 to perform some or all of the rendering of the graphics data. In some examples, the graphics data to be rendered may include a list of graphics primitives, e.g., points, lines, triangles, quadrilaterals, triangle strips, etc.

GPU 12 may be configured to perform graphics operations to render one or more graphics primitives to display 8. Thus, when one of the software applications executing on CPU 6 requires graphics processing, CPU 6 may provide graphics commands and graphics data to GPU 12 for rendering to display 8. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements, such as shader units, that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 8 more quickly than drawing the scenes directly to display 8 using CPU 6.

GPU 12 may, in some instances, be integrated into a motherboard of device 2. In other instances, GPU 12 may be present on a graphics card that is installed in a port in the motherboard of device 2 or may be otherwise incorporated within a peripheral device configured to interoperate with device 2. GPU 12 may include one or more processors, such as one or more microprocessors, application specific integrated circuits (ASICs), field programmable gate arrays (FPGAs), digital signal processors (DSPs), or other equivalent integrated or discrete logic circuitry. GPU 12 may also include one or more processor cores; in this case, GPU 12 may be referred to as a multi-core processor.

GPU 12 may be directly coupled to graphics memory 40. Thus, GPU 12 may read data from and write data to graphics memory 40 without using a bus. In other words, GPU 12 may process data locally using a local storage, instead of off-chip memory. Such graphics memory 40 may be referred to as on-chip memory. This allows GPU 12 to operate in a more efficient manner by eliminating the need of GPU 12 to read and write data via a bus, which may experience heavy bus traffic. In some instances, however, GPU 12 may not include a separate memory, but instead utilize system memory 10 via a bus. Graphics memory 40 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

In some examples, GPU 12 may store a fully formed image in system memory 10. Display processor 14 may retrieve the image from system memory 10 and output values that cause the pixels of display 8 to illuminate to display the image. Display 8 may be the display of device 2 that displays the image content generated by GPU 12. Display 8 may be a liquid crystal display (LCD), an organic light emitting diode display (OLED), a cathode ray tube (CRT) display, a plasma display, or another type of display device.

In accordance with an aspect of the present disclosure, the render output processing (ROP) unit of GPU 12 receives a source pixel value to be written to a pixel location in a render target, wherein the source pixel value is associated with a source node in a hierarchical structure. The ROP unit of the GPU 12 may further receive a destination pixel value of the pixel location in the render target, wherein the destination pixel value is associated with a destination node in the hierarchical structure. The ROP unit of the GPU 12 may operate in a lowest common ancestor mode to output a resulting pixel value associated with the lowest common ancestor node of the source node and the destination node to the pixel location in the render target.

Figure 2:
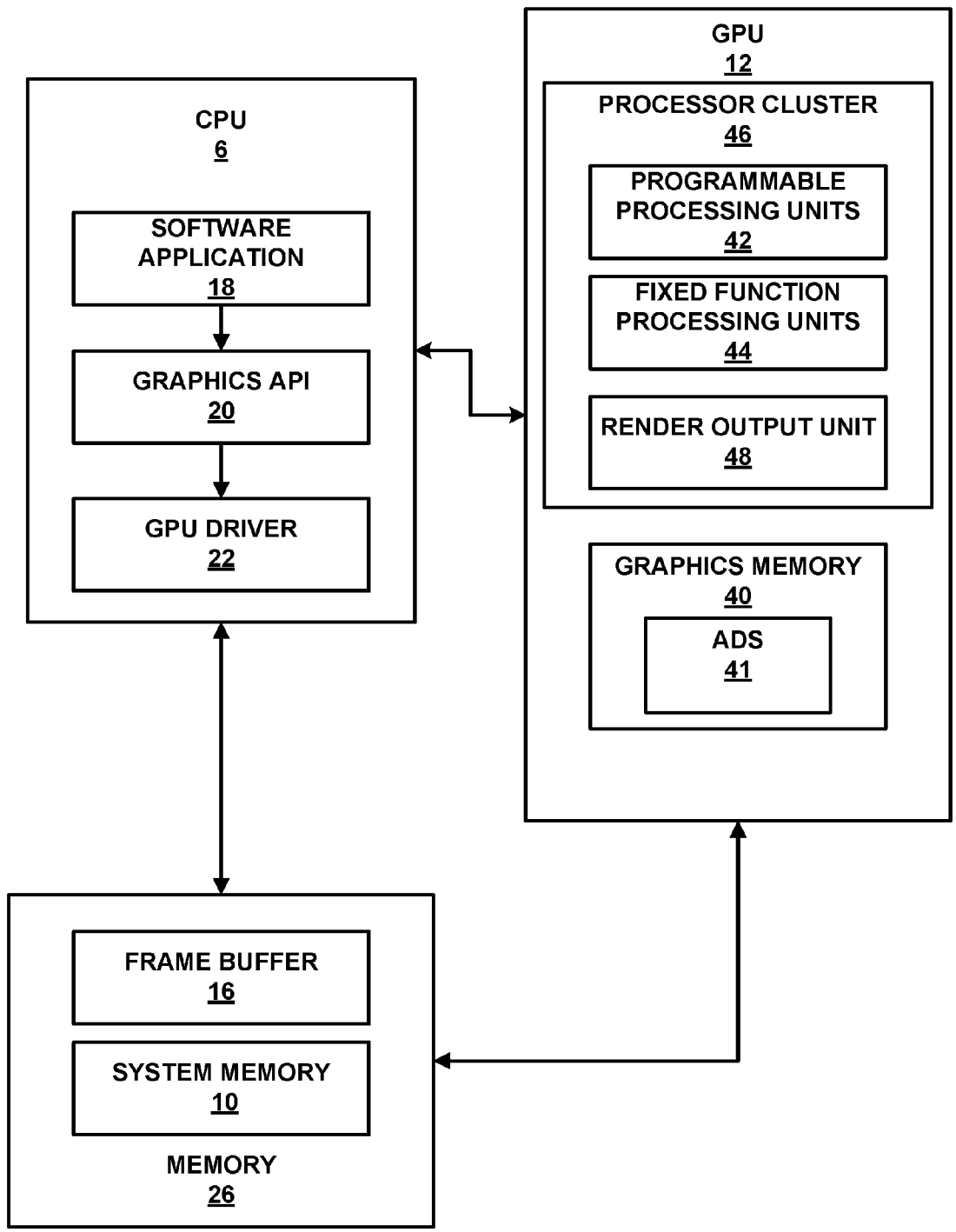
FIG. 2 is a block diagram illustrating example implementations of the CPU, the GPU, and the system memory of FIG. 1 in further detail.

FIG. 2 is a block diagram illustrating example implementations of CPU 6, GPU 12, and system memory 10 of FIG. 1 in further detail. As shown in FIG. 2, CPU 6 may include at least one software application 18, graphics API 20, and GPU driver 22, each of which may be one or more software applications or services that execute on CPU 6.

Memory available to CPU 6 and GPU 12 may include system memory 10 and frame buffer 16. Frame buffer 16 may be a part of system memory 10 or may be separate from system memory 10, and may store rendered image data.

Software application 18 may be any application that utilizes the functionality of GPU 12. For example, software application 18 may be a GUI application, an operating system, a portable mapping application, a computer-aided design program for engineering or artistic applications, a video game application, or another type of software application that uses 2D or 3D graphics.

Software application 18 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 18 may invoke GPU driver 22, via graphics API 20, to issue one or more commands to GPU 12 for rendering one or more graphics primitives into displayable graphics images. For example, software application 18 may invoke GPU driver 22, via graphics API 20, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like. Based on the instructions issued by software application 18 to GPU driver 22, GPU driver 22 may formulate one or more commands that specify one or more operations for GPU 12 to perform in order to render the primitive. When GPU 12 receives a command from CPU 6, processor cluster 46 may execute a graphics processing pipeline to decode the command and may configure the graphics processing pipeline to perform the operation specified in the command. For example, a command engine of the graphics processing pipeline may read primitive data and assemble the data into primitives for use by the other graphics pipeline stages in the graphics processing pipeline. After performing the specified operations, GPU 12 outputs the rendered data to frame buffer 16 associated with a display device.

Frame buffer 16 stores destination pixels for GPU 12. Each destination pixel may be associated with a unique screen pixel location. In some examples, frame buffer 16 may store color components and a destination alpha value for each destination pixel. For example, frame buffer 16 may store Red, Green, Blue, Alpha (RGBA) components for each pixel where the "RGB" components correspond to color values and the "A" component corresponds to a destination alpha value. Frame buffer 16 may also store depth values for each destination pixel. In this way, frame buffer 16 may be said to store graphics data (e.g., a surface). Although frame buffer 16 and system memory 10 are illustrated as being separate memory units, in other examples, frame buffer 16 may be part of system memory 10. Once GPU 12 has rendered all of the pixels of a frame into frame buffer 16, the frame buffer may output the finished frame to display 8 for display.

Processor cluster 46 may include one or more programmable processing units 42 and/or one or more fixed function processing units 44. Programmable processing unit 42 may include, for example, programmable shader units that are configured to execute one or more shader programs that are downloaded onto GPU 12 from CPU 6. In some examples, programmable processing units 42 may be referred to as "shader processors" or "unified shaders," and may perform geometry, vertex, pixel, or other shading operations to render graphics. The shader units may each include one or more components for fetching and decoding operations, one or more ALUs for carrying out arithmetic calculations, one or more memories, caches, and registers.

GPU 12 may designate programmable processing units 42 to perform a variety of shading operations such as vertex shading, hull shading, domain shading, geometry shading, fragment shading, and the like by sending commands to programmable processing units 42 to execute one or more of a vertex shader stage, tessellation stages, a geometry shader stage, a rasterization stage, and a fragment shader (also known as a pixel shader) stage in the graphics processing pipeline. In some examples, GPU driver 22 may cause a compiler executing on CPU 6 to compile one or more shader programs, and to download the compiled shader programs onto programmable processing units 42 contained within GPU 12. The shader programs may be written in a high level shading language, such as, e.g., an OpenGL Shading Language (GLSL), a High Level Shading Language (HLSL), a C for Graphics (Cg) shading language, an OpenCL C kernel, etc. The compiled shader programs may include one or more instructions that control the operation of programmable processing units 42 within GPU 12. For example, the shader programs may include vertex shader programs that may be executed by programmable processing units 42 to perform the functions of the vertex shader stage, tessellation shader programs that may be executed by programmable processing units 42 to perform the functions of the tessellation stages, geometry shader programs that may be executed by programmable processing units 42 to perform the functions of the geometry shader stage and/or fragment/pixel shader programs that may be executed by programmable processing units 42 to perform the functions of the fragment/pixel shader stage. A vertex shader program may control the execution of a programmable vertex shader unit or a unified shader unit, and include instructions that specify one or more per-vertex operations.

Processor cluster 46 may also include fixed function processing units 44. Fixed function processing units 44 may include hardware that is hard-wired to perform certain functions. Although fixed function processing units 44 may be configurable, via one or more control signals for example, to perform different functions, the fixed function hardware typically does not include a program memory that is capable of receiving user-compiled programs. In some examples, fixed function processing units 44 in processor cluster 46 may include, for example, processing units that perform raster operations, such as, e.g., depth testing, scissors testing, alpha blending, low resolution depth testing, etc. to perform the functions of the rasterization stage of the graphics processing pipeline.

Graphics memory 40 is on-chip storage or memory that is physically integrated into the integrated circuit of GPU 12. Because graphics memory 40 is on-chip, GPU 12 may be able to read values from or write values to graphics memory 40 more quickly than reading values from or writing values to system memory 10 via a system bus.

As part of performing ray tracing of a 3D graphics scene, GPU 12 may determine ray-primitive intersections. For example, GPU 12 may determine whether surfaces of the scene intersect light rays cast by a light source in the 3D graphics scene. GPU 12 may also perform shadow mapping of the 3D graphics scene to determine surfaces of the 3D graphics scene that are not illuminated by the light source (and therefore are in shadows). Such surfaces may be in shadows because one or more solid surfaces block the light source from reaching those surfaces. To determine whether a particular location in the 3D graphics scene is shaded from the light source by a surface, GPU 12 may cast a vector called a shadow ray from the location in the direction of the light source. If GPU 12 determines that the shadow ray cast from the location intersects a primitive that is situated between the location and the light source, then GPU 12 may deem the location from which the shadow ray originates to be shaded from the light source.

To determine ray-primitive intersections, GPU 12 may organize the primitives in the 3D graphics scene into a hierarchical structure, such as acceleration data structure (ADS) 41, that hierarchically groups scene primitives (e.g., triangles). GPU 12 may store ADS 41 in graphics memory 40, system memory 10, in shader memory (not shown) of processor cluster 46, or in shared system/graphics memory (not shown). Details of how GPU 12 uses ADS 41 to determine ray-primitive intersections are discussed in further detail with respect to FIGS. 3 and 4.

Processor cluster 46 may also include ROP unit 48, which may be implemented in programmable processing units 42 as programs executed by programmable processing units 42 and/or in fixed function processing units 44 as hardware circuitry. ROP unit 48 may take as inputs pixel and/or texel information and/or pixel values, such as may be output by a pixel shader program running on programmable processing units 42, and may process the inputs into a final pixel value or depth value that may be written into a pixel location of frame buffer 16 or other render targets. Thus, ROP unit 48 may read and write pixel values, including depth, stencil, color, and alpha values, and may perform pixel blending operations to output a pixel value based on the input pixel values.

ROP unit 48 may operate in multiple modes for performing different pixel blending operations. ROP unit 48 may operate in a lowest common ancestor (LCA) mode that take as inputs indications of two nodes of ADS 41 and may output an indication of a lowest common ancestor node of the two nodes. Specifically, ROP unit 48 may receive a pixel value that is associated with a node of ADS 41 from a pixel shader program and may further retrieve a pixel value that is associated with another node of ADS 41 from a pixel location in frame buffer 16 that is the current pixel value of the pixel location. Such a pixel value in the pixel location may be a pixel value previously written to the pixel location in frame buffer 16 or may be initialized during a clear operation. ROP unit 48 may output a pixel value associated with the lowest common ancestor nodes of the two input nodes into the same pixel location in frame buffer 16 from which ROP unit 48 retrieved the pixel value. The pixel values associated with the two nodes of ADS 41 may be color values associated with the two nodes of ADS 41. Similarly, the pixel value associated with the lowest common ancestor node may be a color value associated with the lowest common ancestor node. ROP 48 may determine the lowest common ancestor node of two input nodes of ADS 41 without traversing ADS 41. Instead, ROP 48 may determine the node index of the lowest common ancestor node for two nodes based on the node indices associated with the two input nodes.

Figure 3:
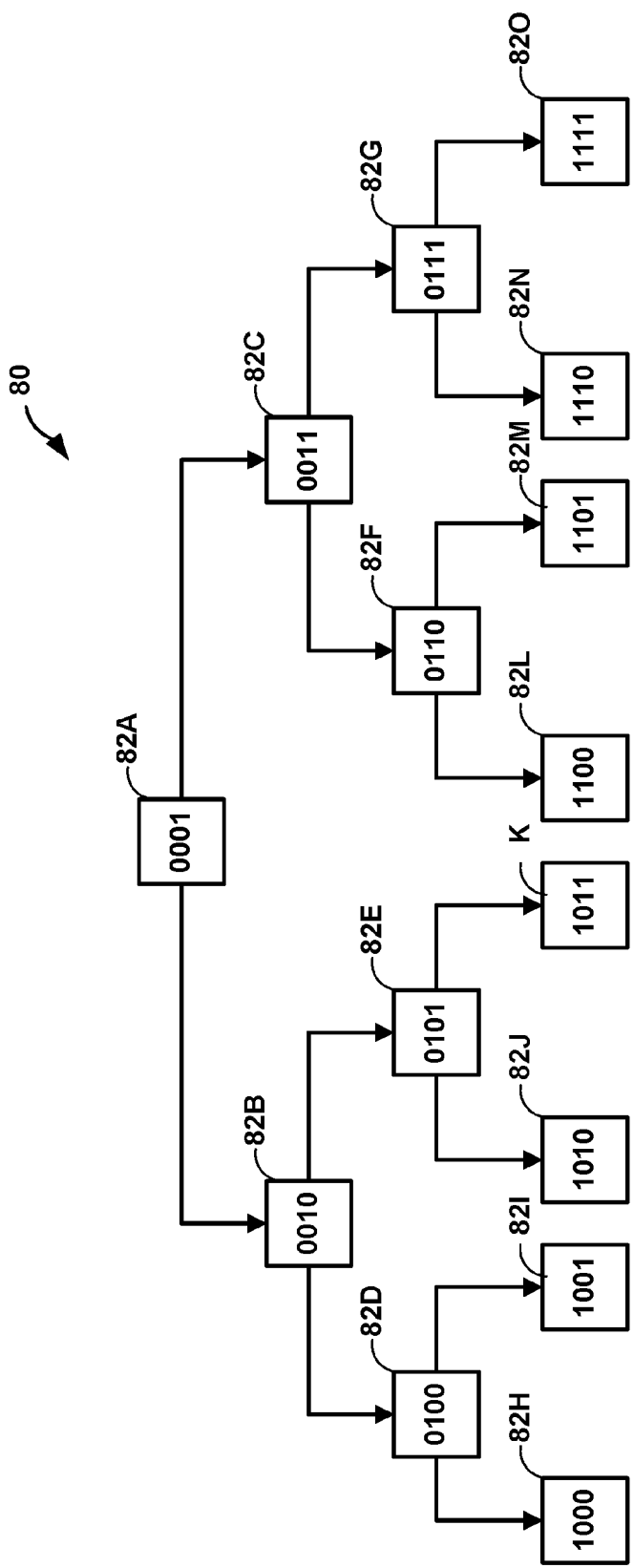
FIG. 3 is a conceptual diagram illustrating an example binary tree.

ROP 48 may determine a lowest common ancestor node of two nodes of a binary tree, such as ADS 41, based at least in part on node indices associated with the two nodes. FIG. 3 is a conceptual diagram illustrating an example binary tree. As shown in FIG. 3, binary tree 80 may be a complete binary tree where each level of binary tree 80, except possibly the last, is completely filled. Binary tree 80 may include nodes 82A-82O ("nodes 82"), and each of nodes 82 may be associated with a node index. Specifically, node indexes associated with Nodes 82 may be consecutively numbered starting from 1, with root node 82A having a node index of 1, nodes 82B and 82C at the second level having respective node indexes 2 and 3 from left to right, nodes 82D-82G at the third level having respective node indexes 4, 5, 6, and 7 from left to right, and nodes 82H-82O at the fourth level having respective node indexes 8, 9, 10, 11, 12, 13, 14, and 15 from left to right. Although binary tree 80 illustrated by FIG. 3 is a complete binary tree, the techniques described throughout this disclosure for determining a lowest common ancestor node of two nodes of a binary tree may be equally applicable to other suitable forms of binary trees, as discussed in more detail with respect to FIG. 7.

As discussed above, ROP unit 48 may operate in an LCA mode to receive as input an indication of two nodes in a binary tree and to output an indication of the lowest common ancestor node of the two input nodes. ROP unit 48 may make the determination based at least in part on the node indices associated with the two input nodes by determining the node index associated with the lowest common ancestor node. Each node index may be represented as a set of bits, where each bit is either set (i.e., has a value of 1) or not set (i.e., has a value of 0). For example, each node index may be a number, and the set of bits representing a particular node index may be the number of the node index that is expressed as a binary number.

To determine the lowest common ancestor node of a first input node and a second input node, ROP unit 48 may align a first set of bits that make up a first node index associated with a first input node with a second set of bits that make up a second node index associated with the second input node under a highest set bit (i.e., most significant bit that is set to 1) of each of the first set of bits and the second set of bits by right-shifting the greater of the first set of bits and the second set of bits to align the first set of bits with the second set of bits. In other words, ROP unit 48 may right-shift the greater of the first and second node indices so that the highest set bits of the first and second node indices are aligned at the same bit position in both the first set of bits and the second set of bits.

Once aligned, ROP 48 may determine the resulting node index associated with the lowest common ancestor node of the first and second input nodes to be the set of consecutive bits of the first and second node indices, as aligned under the highest set bit, that are the same, starting from the highest set bit. ROP unit 48 may determine the node associated with the output node index as the lowest common ancestor node of the two input nodes and may output an indication of the lowest common ancestor node. In this way, ROP 48 may determine the lowest common ancestor node of two nodes in a binary tree based on the node indices of the two nodes without traversing the associated binary tree. Such a technique for determining the lowest common ancestor, as described herein, may be potentially more efficient than techniques that rely on traversing at least a portion of the binary tree to determine the lowest common ancestor node of two nodes.

Figure 4A:
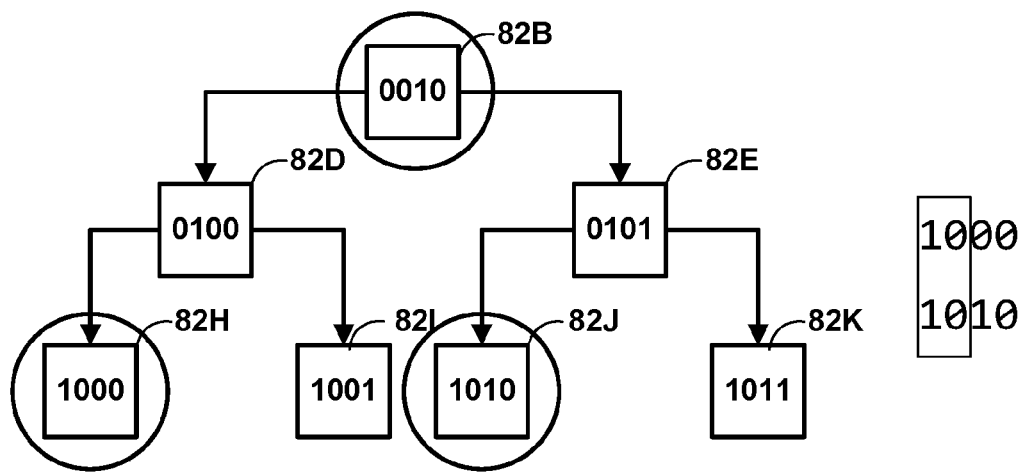
FIGS. 4A-4D are conceptual diagrams illustrating examples of determining example node indexes of lowest common ancestor nodes of nodes according to the technique described with respect to FIG. 3.

FIGS. 4A-4D are conceptual diagrams illustrating examples of determining example node indexes of lowest common ancestor nodes of nodes according to the technique described with respect to FIG. 3. Although the techniques illustrated in FIGS. 4A-4D are directed towards 4-bit node indices, the illustrated techniques may be equally applicable to node indices of any other suitable width, such as 8-bit node indices, 16-bit node indices, 32-bit node indices, 64-bit node indices, and the like. As shown in FIG. 4A, ROP unit 48 may receive as inputs an indication of node 82H having a 4-bit node index of 1000 and an indication of node 82J having a 4-bit node index of 1010. To determine the lowest common ancestor node of nodes 82H and 82J, ROP 48 may align the node indices of nodes 82J and 82H of 1000 and 1010, respectively, under the highest set bit of the smaller node index. Because both node indices have the highest set bit in the same position, ROP 48 does not shift either of the two node indices. ROP unit 48 may, starting from the highest set bit of both node indices, determine the node index of the lowest common ancestor node of nodes 82H and 82J as the bits that are the same for both node indexes, and may thereby determine that 10 is the node index associated with the lowest common ancestor node. Because node indexes in FIGS. 8A-8D are represented by four bits, the node index of the lowest common ancestor node is 0010, which is associated with node 82B. Thus, ROP 48 may determine node 82B as being the lowest common ancestor node of nodes 82H and 82J.

Figure 4B:
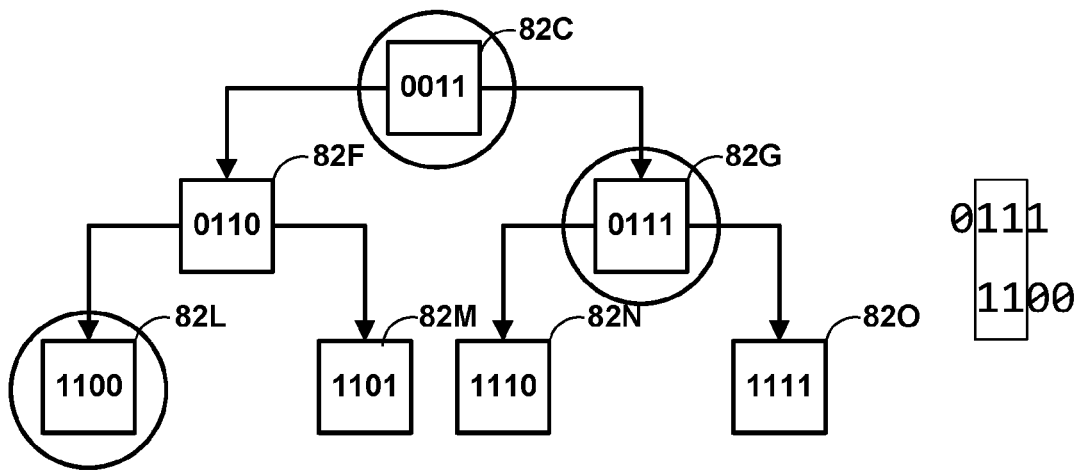

As shown in FIG. 4B, ROP 48 may determine the lowest common ancestor node of nodes 82G having a node index of 0111 and 82L having a node index of 1100. ROP 48 may align the node indices 0111 and 1100 under the highest set bit by right shifting the greater node index, which is 1100, such that the highest set bit of the right-shifted node index is the same as the highest set bit of the other of the two node indices. ROP unit 48 may right shift 1100 once to result in 0110, thereby aligning the highest set bit of 0110 with the highest set bit of 0111. ROP unit 48 may determine the node index of the lowest common ancestor node of nodes 82G and 82L as the bits that are the same for both node indices 0110 and 0110, starting from the highest set bit, and may thereby determine that 11 is the node index associated with the lowest common ancestor node. Because node indexes in FIGS. 4A-4D are represented by four bits, the node index of the lowest common ancestor node is 0011, which is the node index associated with node 82C. Thus, ROP 48 may determine node 82B as being the lowest common ancestor node of nodes 82G and 82L.

Figure 4C:
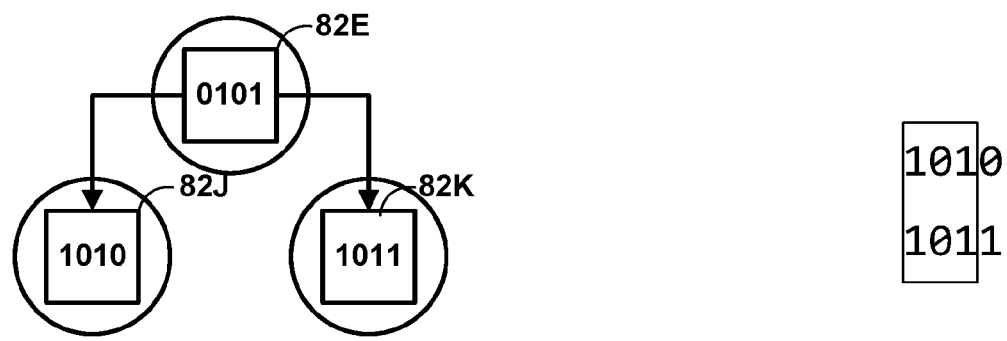

As shown in FIG. 4C, ROP 48 may determine the lowest common ancestor node of nodes 82J having a node index of 1010 and 82K having a node index of 1011. ROP 48 may align 1010 and 1011 under the highest set bit. Because both 1010 and 1011 have the same highest set bit, ROP 48 may not shift either of the node indices. ROP 48 may determine the node index of the lowest common ancestor node of nodes 82J and 82K as the bits that are the same for both node indexes starting from the highest set bit of both node indices. ROP 48 may therefore determine that 101 is the node index associated with the lowest common ancestor node. Because node indexes in FIGS. 8A-8D are represented by four bits, the node index of the lowest common ancestor node is 0101, which is associated with node 82E. Thus, ROP may determine node 82E as being the lowest common ancestor node of nodes 82J and 82K.

Figure 4D:
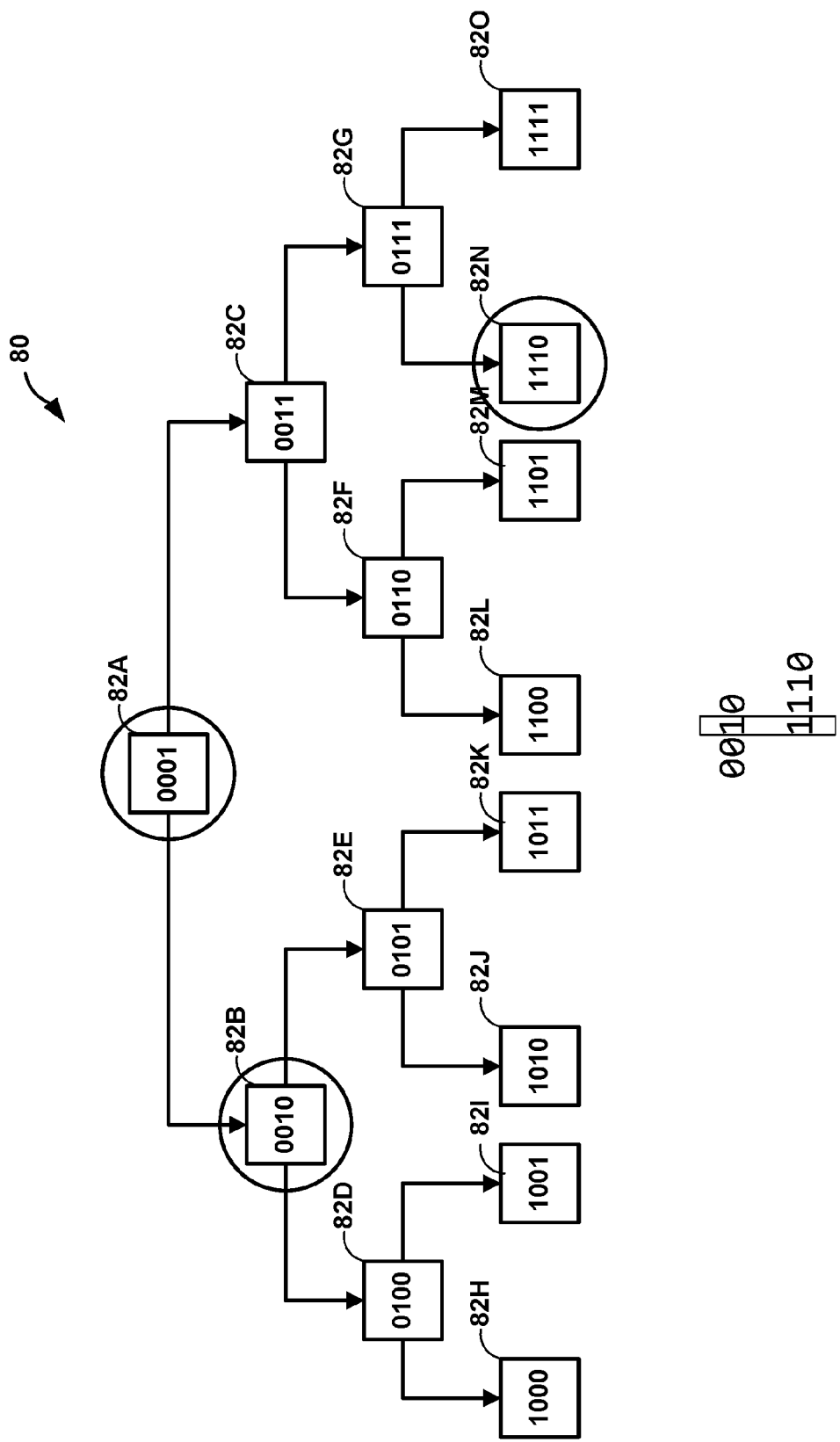

As shown in FIG. 4D, ROP 48 may determine the lowest common ancestor node of nodes 82B having a node index of 0010 and 82N having a node index of 111. ROP 48 may align 0010 and 1110 under the highest set bit of the smaller number by right shifting the bigger number, which is 1110. ROP 48 may right shift 1110 twice to result in 0011, such that the highest set bit of 0010 with 0011 are now aligned. ROP 48 may determine the node index of the lowest common ancestor node of nodes 82B and 82N as the bits that are the same for both node indexes, starting from the highest set bit, and may thereby determine that 1 is the node index associated with the lowest common ancestor node. Because node indexes in FIGS. 4A-4D are represented by four bits, the node index of the lowest common ancestor node is 0001, which is associated with node 82A. Thus, ROP 48 may determine node 82A as being the lowest common ancestor node of nodes 82B and 82N.

An example algorithm used by ROP 48 to determine the lowest common ancestor of two nodes may be expressed by the following pseudocode, where the LCA function takes two node indexes as node parameters and returns the node index of the lowest common ancestor:

```
function LCA(uint first, uint second)
    if first > second then
        swap(first, second)
    end if
    if first = 1 then
        return 1
    end if
    shift ←firstBitHigh(second) − firstBitHigh(first)
    second ← bitShiftRight(second, shift)
    while first ≠ second do
        first ← bitShiftRight(first, 1)
        second ← bitShiftRight(second, 1)
    end while
    return first
end function
```

In the pseudocode shown above, the input parameters first and second are node indices for two input nodes for which the lowest common ancestor function determines the node index of the lowest common ancestor node. In the function, if the smaller of the two node indices is associated with the root node, then the function simply returns the node index of the root node. If the smaller of the two node indices is not associated with the root node, the function may right-shift the greater of the two node indexes to align the highest set bits of the two node indices. The function may then determine the bits that are the same in both node indexes, starting from the highest set bit of the two node indices as aligned, by right-shifting both the first and second node indexes until the resulting first node index is the same as the second node index.

By right shifting the first and node indexes in such a fashion, the function eliminates bits of the first and second node indexes that do not match to result in only bits that are the same in both node indexes. When the remaining bits of the first node index are the same as those of the second node index, thereby indicating that the remaining bits are the same in both node indexes, the lowest common ancestor function returns the remaining bits of the second node index as the node index of the lowest common ancestor node for the two input nodes.

An example of how ROP 48, to determine the lowest common ancestor of two nodes, can be implemented in hardware is shown in the following pseudocode:

```
LCA (A, B) // A, B are uint32 format
{
    Align A and B by their leading "1" -> A', B' to the
    smaller number, ignoring all bits before the first "1", so
    A' and B' are N bits width
        C = XOR(A', B') // {N−1, 0}
        Find the leading "1" of C, which is bit M
        Return bits {N−1, M+1} of A'
}
```

In the example pseudocode above, A and B are node indices having N bits, where N is 32. If A and B were 4-bit node indexes 0111 and 1100, respectively, ROP 48 may align A and B to result in A' and B' by right-shifting 1100 by one bit to result in 0110. ROP 48 may ignore all bits before the first set bit on both node indices 0111 and 0110 to result in A' and B' of 1110 and 1100, respectively. C, which is the result of performing XOR on A' and B', may be 0010. The leading '1' of C is bit 1 (the second rightmost bit, where the rightmost bit is bit 0), and thus M is 1. For a 4-bit node index, ROP 48 may return bits (N−1, M+1) of A' by returning bits 3 to 2 of A', which is 11. Thus, the function LCA(0111, 1100) may return a node index of 0011, which is the node index for node 82C of binary tree 80.

As can be seen, whether ROP 48 is implemented in software, hardware, or a combination of software and hardware, ROP 48 aligns two node indexes represented in binary under the highest set bit and determines the output node index to be the bits of the two node indexes, as aligned under the highest set bit that are the same, starting from the highest set bit. In an alternate technique for determining the lowest common ancestor node of two nodes, ROP 48 may represent each node index as a binary value along with a mask.

Figure 5:
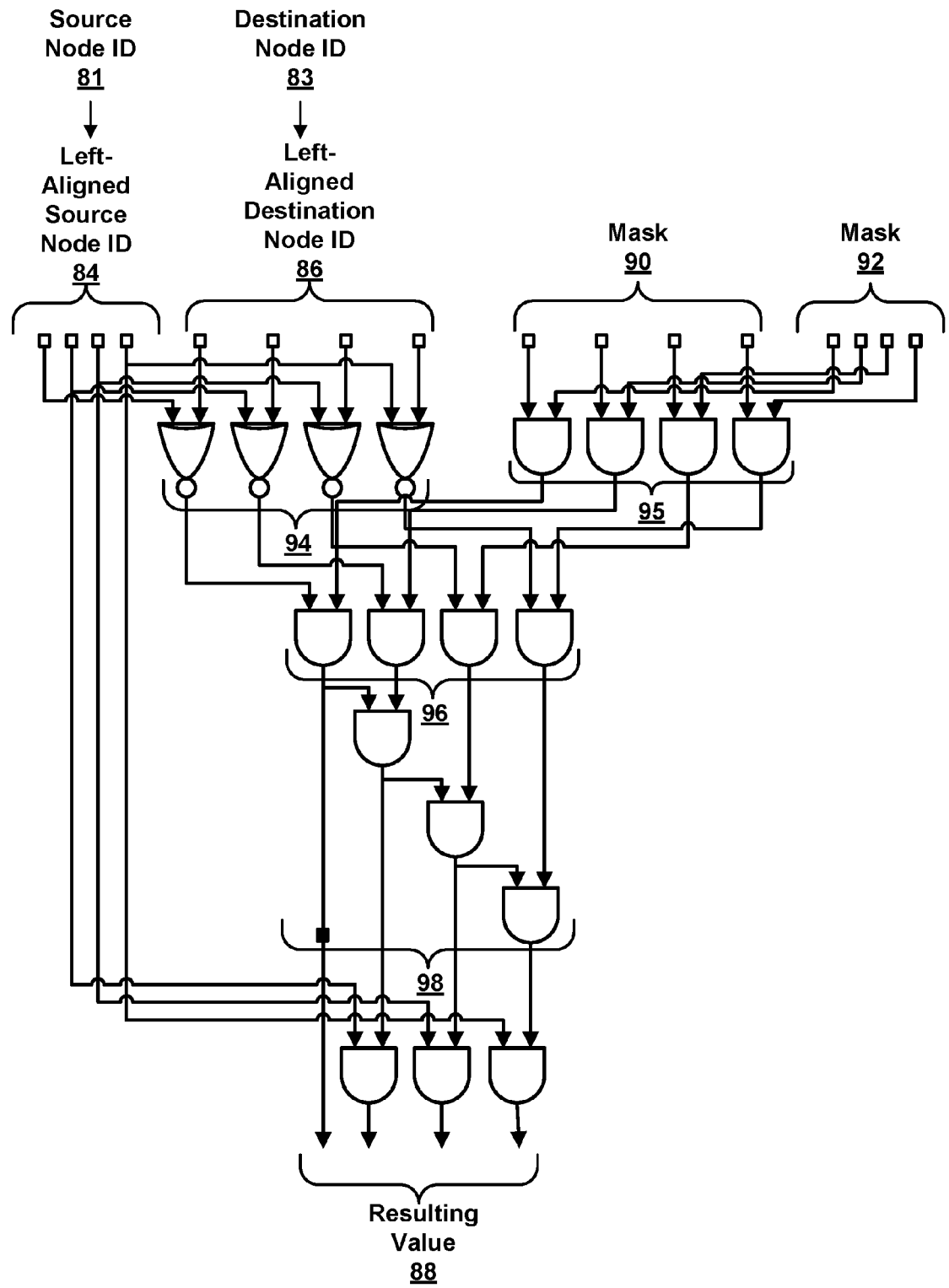
FIG. 5 is a block diagram illustrating an example alternate technique for determining a lowest common ancestor node.

ROP 48 may also utilize other suitable techniques for determining a lowest common ancestor node. FIG. 5 is a block diagram illustrating an example alternate technique for determining a lowest common ancestor node. While FIG. 5 illustrates an example in terms of 4-bit node indices, the techniques illustrated may be applicable to node indices having any number of suitable bits, such as 8-bit node indices, 16-bit node indices, 32-bit node indices, 128-bit node indices, and the like.

ROP 48 may take as inputs indications of two nodes of a tree and may determine the associated node indices of the two nodes. ROP 48 may left-align each of the two set of bits making up the node indices of the two nodes by left-shifting, if necessary, one or more the two sets of bits, such that the highest bit of each of the two left-aligned set of bits is set (i.e., has a value of 1). ROP 48 may determine the consecutive common bits, starting from the highest bit, of the two left-aligned set of bits. ROP 48 may determine at least a portion of the consecutive common bits, starting from the highest bit, of the two left-aligned set of bits as making up the set of bits of the node index associated with lowest common ancestor node of the two nodes.

As shown in FIG. 5, a first input node received by ROP 48 may be associated with source node index 81 and a second input node received by ROP 48 may be associated with destination node index 83. ROP 48 may left-align both source node index 81 and destination node index 83 such that the most significant bit of both source node index 81 and destination node index 83 are set, to generate left-aligned source node index 84 and left-aligned destination node index 86. ROP 48 may left-align an index by left-shifting the node index until the highest bit of the node index is set to 1. In an example, if source node index 81 has a value of 1001, then no left-shifting of source node index 81 is necessary and the left-aligned source node index 84 also has a value of 1001. In another example, if destination node index 83 has a value of 0110, then ROP 48 may left-shift the value of destination node index 83 by 1 so that destination node index 83 has its highest bit set to 1 to generate a value for left-aligned destination node index 86 of 1100.

ROP 48 may also generate masks 90 and 92 associated with respective left-aligned source node index 84 and left-aligned destination node index 86, respectively, based at least in part on by how many bits ROP 48 had to left-shift source and destination node indices 81 and 83 to generate source node index 84 and left-aligned destination node index 86. Masks 90 and 92 may indicate by how many bits ROP 48 have left-shifted source and destination nodes indices 81 and 83 to result in associated left-aligned source and destination node indices 84 and 86. Masks 90 and 92 may have default values of all set bits (e.g., 1111) that ROP 48 may left-shift for each time ROP 48 left-shifts the corresponding node indices. In the example where the source node index 81 has a value of 1001, mask 90 may have a value of 1111 because ROP 48 did not left-shift the value of source node index 81 to result in left-aligned source node index 84 having a value of 1001. In the example where destination node index 83 has a value of 0110, ROP 48 may correspondingly left-shift 1111 by 1 to result in mask 92 having a value of 1110 because ROP 48 left-shifted the value of destination node index 83 by 1 to result in left-aligned destination node index 86 having a value of 1100.

ROP 48 may determine which corresponding bits of left-aligned source node index 84 and left-aligned destination node index 86 have the same value by performing a bitwise exclusive nor (XNOR) of left-aligned source node index 84 with left-aligned destination node index 86 to result in XNOR value 94. The result of performing bitwise XNOR on two bits may be 1 if and only if the values of the two bits have the same value (i.e., both is or both Os), and may be 0 if the values of the two bits have different values. Thus, XNOR value 94 indicates which bits of corresponding bits of left-aligned source node index 84 and left-aligned destination node index 86 have the same value.

ROP 48 may also perform a bitwise AND of mask 90 and mask 92 to determine masking bits 95, which indicates the position of bits in left-aligned source node index 84 and left-aligned destination node index 86 that ROP 48 determines as possibly form the set of bits that indicate the node index of the lowest common ancestor node. For example, if mask 90 has a value of 1111, and mask 92 has a value 1110, then masking bits 95 may have a value of 1110. The value 1110 indicates to ROP 48 that the most significant three bits of left-aligned source node index 84 and left-aligned destination node index 86 may possibly form the set of bits that indicate the node index of the lowest common ancestor node. However, the least significant bit of left-aligned source node index 84 and left-aligned destination node index 86 cannot be one of the set of bits that indicate the node index of the lowest common ancestor node.

ROP 48 may determine matching bits 96 that indicate the bit positions of left-aligned source node index 84, as indicated by XNOR value 94, as having the same value as corresponding bits of left-aligned destination node index 86, that are also within the bit positions as indicated by masking bits 95. To that end, ROP 48 may perform bitwise AND of XNOR value 94 with masking bits 95 to result in match bits 96. For example, if XNOR value 94 is 1110 and masking bits 96 has a value of 1100, ROP 48 may determine the value of matching bits 96 to be 1100. Even though the $3^{rd}$ bit of XNOR value 94 is a 1, thereby indicating that the $3^{rd}$ bit of left-aligned source node index 84 has the same value as the $4^{rd}$ bit of left-aligned destination node index 86, the $3^{rd}$ bit of masking bits having a value of 0 indicates that the $3^{rd}$ bit of left-aligned source node index 84 is not included as one of the set of bits that indicate the node index of the lowest common ancestor node.

As discussed above, the node index of the lowest common ancestor of two nodes may be indicated by the consecutive matching bits of left-aligned source node index 84 and left-aligned destination node index 86 starting from the highest bit. Thus, ROP 48 may nonetheless omit corresponding matching bits of left-aligned source node index 84 and left-aligned destination node index 86 from the set of bits that indicate the node index of the lowest common ancestor node if those corresponding matching bits follow corresponding non-matching bits going from the most significant bit to the least significant bit (left to right).

ROP 48 may determine a value for result mask 98 that indicate the bit positions of consecutive matching bits, from the most significant bit to the least significant bit, of left-aligned source node index 84 and left-aligned destination node index 86, where the consecutive matching bits are within the range of bit positions indicated by match bits 96. For example, if match bits 96 has a value of 1010, ROP 48 may determine the value of corresponding result mask 98 to be 1000. While the third bit (starting from the most significant bit) of match bits 96 has a value of 1, thereby indicating that the value of the third bit of left-aligned source node index 84 matches the value of the third bit of left-aligned destination node index 86, the second bit of match bits is 0, thereby indicating that the value of the second bit of left-aligned source node index 84 does not match the value of the second bit of left-aligned destination node index 86, and thus is not consecutive with other matching bits as indicated by match bits 96.

To determine the value of result mask 98, ROP 48 may set the leading (left-most) bit of resulting mask 98 to the value of the leading bit of match bits 96. ROP 48 may further set the value of each bit at position X of resulting mask 98, except the leading bit of resulting mask 98, as the result of performing bitwise AND of the values of the bit at position X+1 of match bits 96 and the bit at position X of match bits 96. For example, the value of the second left-most bit of resulting mask 98 may be the result of a bitwise AND of the value of the left-most bit of match bits 96 and the value of the second left-most bit of match bits 96. Thus, for each bit of resulting mask 98 except for the leading bit, ROP 48 may set the value of the bit to 1 only if the corresponding bits of left-aligned source node index 84 and left-aligned destination node index 86 match each other and the corresponding bits at the previous position (e.g., the bit position to the left of the current bit position) of left-aligned source node index 84 and left-aligned destination node index 86 also match. In this way, ROP 48 may generate result mask 98 that indicates the positions of bits of left-aligned source node index 84 that are included in the set of bits that indicate the node index of the lowest common ancestor node.

ROP 48 may determine resulting value 88 that indicates the node index of the lowest common ancestor node. ROP 48 may determine the value of the leading bit of resulting value 88 to be the same as the value of the leading bit of match bits 96. ROP 48 may also set the value of each bit X of resulting value 88, except the leading bit of resulting value 88, as the result of performing bitwise AND of the value of bit X of resulting mask 98 and the value of bit X of the left-aligned source node index 84. The resulting mask may indicate which bits of resulting value 88 form the node index of the lowest common ancestor node of the two input nodes associated with source node index 84 and destination node index 86. If a bit of resulting mask is set to 1, then the corresponding bit of resulting value 88 is included as one of one or more bits that indicate the node index of the lowest common ancestor node.

In one example, if ROP 48 takes as inputs source node index 81 having a value of 1010 and destination node index 83 having a value of 1011, no left-shifting of source node index 81 or destination node index 83 is necessary for ROP 48 to generate left-aligned source node index 84 having a value of 1010 and left-aligned destination node index 86 having a value of 1011. Correspondingly, values for masks 90 and 92 are both 1111 to indicate that ROP 48 did not have to left-shift the values of source and destination indices 81 and 83 to generate values for left-aligned source and destination indices 84 and 86.

ROP 48 may perform a bitwise XNOR of the values of left-aligned source node index 84 and left-aligned destination node index 86 by performing a bitwise XNOR of 1010 with 1011 to result in XNOR value 94 of 1110. ROP 48 may perform a bitwise AND of the values of masks 90 and 92 each having a value of 1111 to result in masking bits 95 having a value of 1111. ROP 48 may perform a bitwise AND of XNOR value 94 with the values of 1111 by performing a bitwise AND of 1110 with 1111 to result in match bits 96 having a value of 1110.

ROP 48 may determine the value of resulting mask 98 by setting the highest bit of resulting mask 98 to have the same value as the highest bit of match bits 96. Because the highest bit of match bits 96 has a value of 1, ROP 48 may also set the value of the highest bit of resulting mask 98 to 1. ROP 48 may set the value of the second bit of resulting mask 98 as the result of performing a bitwise AND of the value of the highest bit of matching bits 96 with the value of the second bit of matching bits 96 to result in a value of 1. ROP 48 may set the value of the third bit of resulting mask 98 as the result of performing a bitwise AND of the value of the second bit of matching bits 96 with the value of the third bit of matching bits 96 to result in a value of 1. ROP 48 may set the value of the fourth bit of resulting mask 98 as the result of performing a bitwise AND of the value of the third bit of matching bits 96 with the value of the fourth bit of matching bits 96 to result in a value of 0. ROP 48 may therefore determine the value of resulting mask 98 as being 1110 based at least in part on the value of match bits 96.

ROP 48 may also determine resulting value 88 of 1010 based at least in part on the value of match bits 96, the value of left-aligned source node index 84, and the value of resulting mask 96. ROP 48 may set the value of the highest bit of resulting value 88 as the same value as the highest bit of match bits 96. Because the highest bit of match bits 96 has a value of 1, ROP 48 may also set the value of the highest bit of resulting value 88 to 1. ROP 48 may set the value of the second bit of resulting value 88 as the result of performing a bitwise AND of the value of the second bit of left-aligned source node index 84 with the value of the second bit of resulting mask 96 to result in a value of 0. ROP 48 may set the value of the third bit of resulting value 88 as the result of performing a bitwise AND of the value of the third bit of left-aligned source node index 84 with the value of the third bit of resulting mask 96 to result in a value of 1. ROP 48 may set the value of the fourth bit of resulting value 88 as the result of performing a bitwise AND of the value of the fourth bit of left-aligned source node index 84 with the value of the fourth bit of resulting mask 96 to result in a value of 0. ROP 48 may therefore determine resulting value 88 to be 1010.

Because resulting mask 98 has a value of 1110, resulting mask 98 indicates that the highest three bits (101) of resulting value 88 indicate the node index of the lowest common ancestor node for nodes having node indices of 1010 and 1011. In this example, because a node index is a 4-bit value, ROP 48 may right-shift the three bits 101 once to result in a 4-bit node index of 0101. ROP 48 may therefore determine the node index of the lowest common ancestor node to be 0101.

The following pseudocode shows the example technique of determining the node index of a lowest common ancestor node of two nodes as illustrated in FIG. 5, but in the context of 32-bit node indices:

```
unsigned int xnor = ~(src ^ dst);
unsigned int matchBits = xnor & srcMask & dstMask;
unsigned int resMask = (1 << 31);
for (int i = 30; i > 0; i--)
{
    unsigned int bitValue = ((matchBits & (1 << i)) >> i) &
    ((resMask & (1 << (i + 1))) >> (i + 1));
        resMask |= (bitValue << i);
}
unsigned int resValue = src & resMask;
```

In the pseudocode, the variable src may correspond to left-aligned source node index 84, the variable dst may correspond to left-aligned destination node index 86, the srcMask may correspond to mask 90, and the variable dstMask may correspond to mask 92. Further, the variable matchBits may correspond to match bits 96, the variable resMask may correspond to resulting mask 98, and resValue may correspond to resulting value 88. As can be seen in the pseudocode, because each of left-aligned source node index 84, mask 90, and mask 92 are left-aligned, ROP 48 may set the highest bit of each of left-aligned destination node index 86, mask 90, and mask 92 to 1, and may correspondingly also set the highest bit of resulting mask 98 to 1. Correspondingly, because a bitwise OR of the highest bits of left-aligned source node index 84 and resulting mask 98 may also always result in a value of 1, ROP 48 may also set the highest bit of resulting value 88 to 1. Further, according to the pseudocode, ROP 48 may determine resulting value 88 to be the result of performing a bitwise AND operation on left-aligned source node index 84 and resulting mask 98.

As can be seen, ROP 48, while operating in LCA mode, may implement various techniques as described above to efficiently determine the lowest common ancestor node of two nodes of a binary tree without traversing the binary tree based on the two nodes. As described below, GPU 12 may employ such techniques to more efficiently determine ray-primitive intersections for ray tracing.

Figure 6:
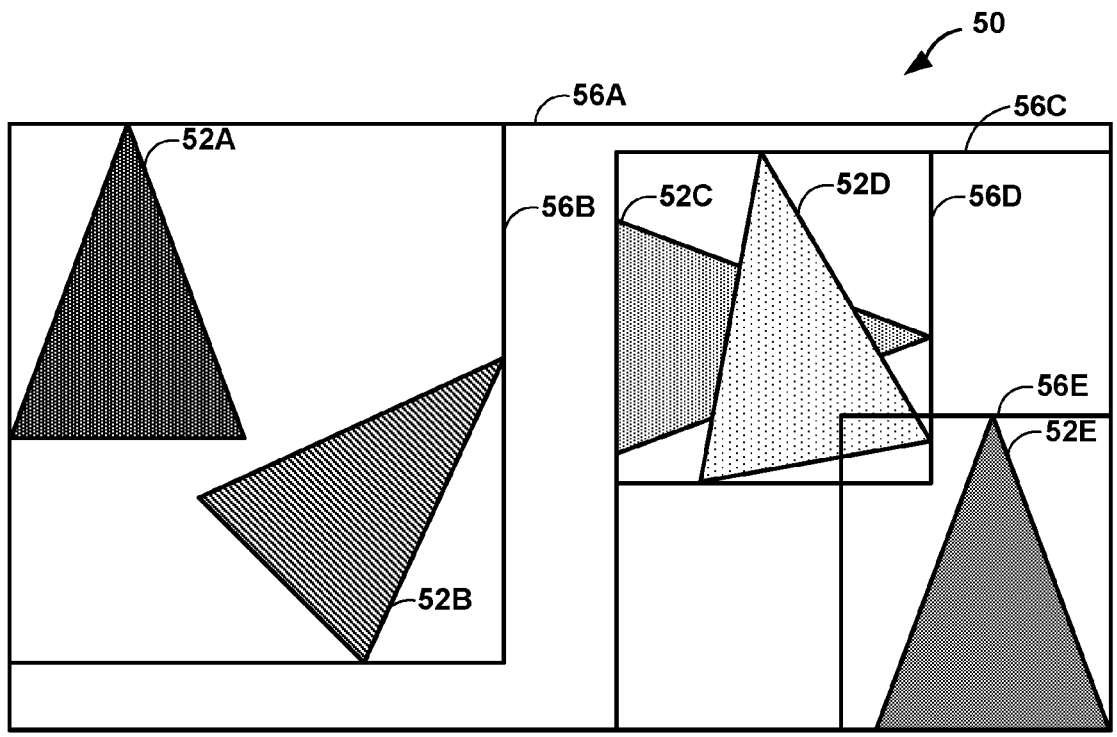
FIG. 6 is a conceptual diagram illustrating an example graphics scene onto which the GPU may perform ray tracing and an example partitioning of the graphics scene into bounding volumes.

FIG. 6 is a conceptual diagram illustrating an example graphics scene onto which GPU 12 may perform ray tracing and an example partitioning of the graphics scene into bounding volumes. As shown in FIG. 6, graphics scene 50 may be a 3D graphics scene that includes primitives 52A-52E (hereafter "primitives 52"). As part of the ray tracing process, GPU 12 may cast rays from a viewpoint through each pixel of a 2D representation of the 3D graphics scene 50 to determine whether each ray intersects one or more of primitives 52. If the ray that GPU 12 casts through a particular pixel of the 2D representation intersects a primitive, GPU 12 may determine a pixel value, such as the color value, alpha value, and the like, for the particular pixel of the 2D representation based at least in part on the intersected primitive. In this way, GPU 12 may render a 2D representation of 3D graphics scene 50 based at least in part on performing ray tracing of graphics scene 50.

GPU 12 may systematically determine whether a primitive in primitives 52 intersects a particular ray by dividing graphics scene 50, hierarchically arranging the divided portions of graphics scene 50, and recursively traversing the hierarchy of the divided portions of graphics scene 50. GPU 12 may conceptually partition primitives 52 into bounding volumes. 56A-56E ("bounding volumes 56"), and may bind primitives 52 into bounding volumes 56. Bounding volumes 56 may be two-dimensional or three-dimensional axis-aligned bounding boxes (AABBs), which may be bounding boxes having a minimized area within which all points of the enclosed primitives may lie. The bounding boxes may be axis-aligned such that the edges of the boxes may be parallel to the coordinate axis (e.g., the x, y, and z axis).

Bounding volume 56A may be a bounding box that bounds all primitives 52 of graphics scene 50. Bounding volumes 56B and 56C may be subsets of bounding volume 56A in that bounding volumes 56B and 56C bound a subset of the portion of scene 50 bound by bounding volume 56A. In other words, bounding volume 56A may enclose bounding volumes 56B and 56C. Bounding volume 56B may bind primitives 52A and 52B, and bounding volume 56C may bind primitives 52C, 52D, and 52E. Bounding volumes 56D and 56E may be subsets of bounding volume 56C, and may bind a subset of the portion of scene 50 bound by bounding volume 56B. Bounding volume 56D may bound primitives 52C and 52D, and bounding volume 56E may bound primitive 52E.

In the example shown in FIG. 6, GPU 12 may partition primitives 52 into five bounding volumes 56A-56E. GPU 12 is not limited to five bounding volumes 56A-56E but may, depending on the scene and the number of primitives in the scene, use more than or fewer than five bounding volumes 56A-56E. In some examples GPU 12 may create additional bounding volumes as subsets of bounding volume 56B to individually bound primitives 52A and 52B, respectively. In some examples, CPU 6 may also be configured to partition primitives 52 into bounding volumes 56.

Figure 7:
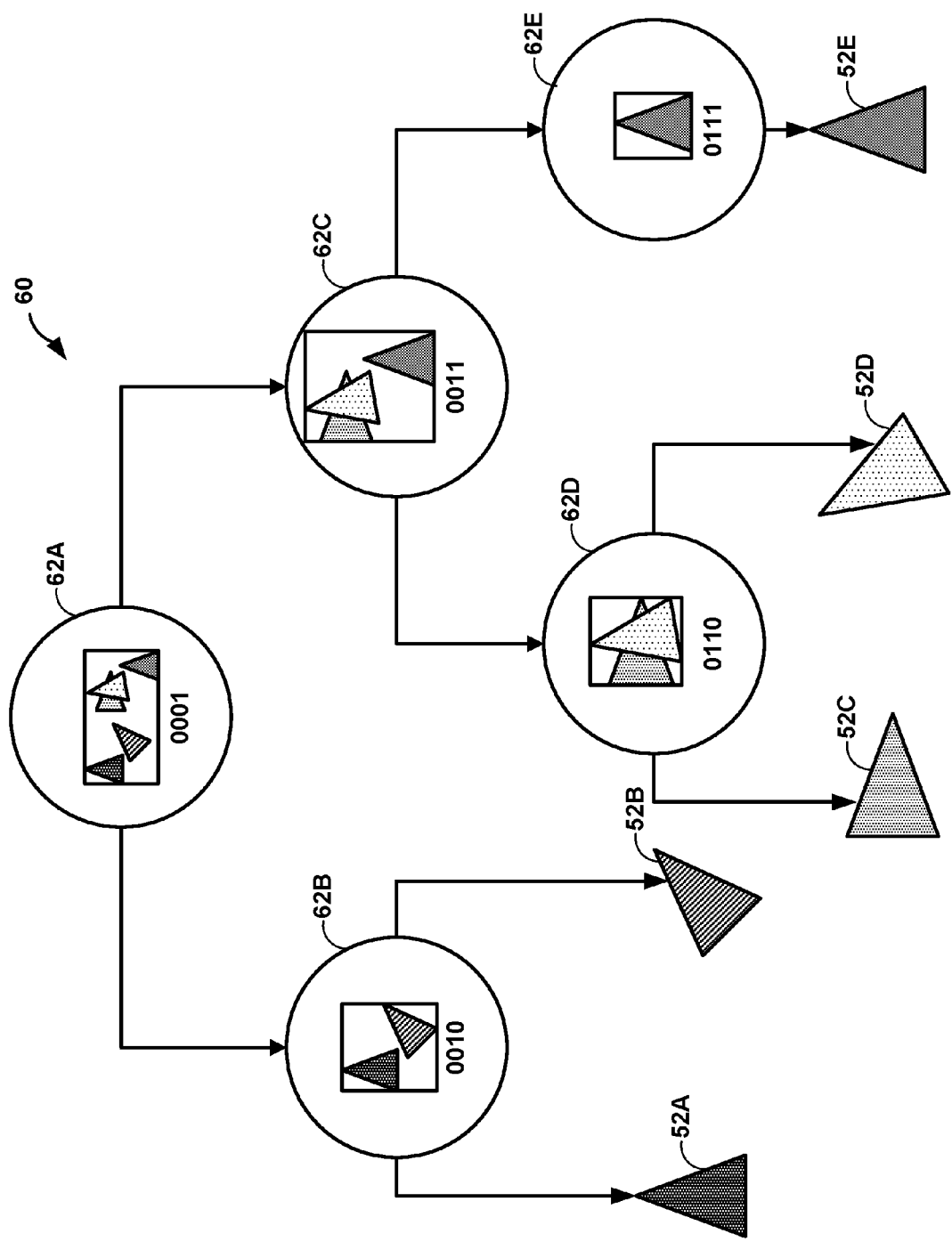
FIG. 7 is a conceptual diagram illustrating an example hierarchical data structure having nodes that are associated with example bounding volumes and primitives shown in FIG. 6.

GPU 12 may organize bounding volumes 56 in a hierarchical structure such that GPU 12 may traverse the hierarchical structure to determine possible ray-primitive intersections. FIG. 7 is a conceptual diagram illustrating an example hierarchical data structure having nodes that are associated with the bounding volumes 56 and primitives 52 shown in FIG. 6. As discussed above, GPU 12 may bind primitives 52 of a scene into bounding volumes 56, and may organize bounding volumes 56 into a hierarchical structure such as ADS 41. GPU 12 may traverse ADS 41 to determine possible ray-primitive intersections. As shown in FIG. 7, one example of ADS 41 may be a bounding volume hierarchy (BVH) tree 60 in which nodes 62A-62E ("nodes 62") of BVH tree 60 associated with bounding volumes 56 and primitives 52 of graphics scene 50 are hierarchically arranged into a tree-like structure.

Specifically, GPU 12 may arrange BVH tree 60 such that a node associated with a bounding volume that encloses another bounding volume may be a parent node of the node associated with the enclosed bounding volume. In the example of FIG. 6, because bounding volume 56C encloses bounding volumes 56D and 56E, which are subsets of bounding volume 56C, node 62C associated with bounding volume 56C may be a parent node of nodes 62D and 62E associated with bounding volumes 56D and 56E, respectively. Therefore, root node 62A may be associated with bounding volume 56, interior node 62C may be associated with bounding volume 56C, and leaf nodes 62B, 62D, and 62E may be associated with bounding volumes 56B, 56D, and 56E, respectively.

Nodes of BVH tree 60 other than root node 62A may be referred to as non-root nodes of BVH tree 60. For example, interior node 62C and leaf nodes 62B, 62D, and 62E may be referred to as non-root nodes of BVH tree 60. Leaf nodes 62B, 62D, and 62E may each be linked with at least one primitive of primitives 52. For example, leaf node 62B may be linked with primitives 52A and 52B because bounding volume 56B associated with leaf node 62D encloses primitives 52A and 52B, leaf node 62D may be linked with primitives 52C and 52D because bounding volume 56D associated with leaf node 62D encloses primitives 52C and 52D, and leaf node 62E may be linked with primitive 52E because bounding volume 56E associated with leaf node 62E encloses primitive 52E. BVH tree 60 may be considered an unbalanced binary tree because each non-leaf node of hierarchical data structure 60 has at most two child nodes, and because leaf nodes 62B, 62D, and 62E may have unequal depths.

Nodes 62 of BVH tree 60 may each be associated with a node index that is different for each node of nodes 62. Node indices for nodes 62 are numbered in a fashion similar to that of binary tree 80 shown in FIG. 3, even though BVH tree 60 is an unbalanced binary tree. In the example of FIG. 7, node indices may have 4-bit values, but it should be understood that node indices may be of any suitable size, including but not limited to 4-bit values, 8-bit values, and the like.

Root node 62A may be associated with a node index having a value of 0001 in binary. At the next level of BVH tree 60, values of node indices may be consecutively numbered from one node to another going left to right at the same level, and even from the rightmost node of a previous level of BVH tree 60 to the leftmost node of the next level of BVH tree 60. Thus, node 62B may be associated with a node index having a value of 0010 and node 62C may be associated with a node index having a value of 0011. At the next level of BVH tree 60, although node 62B does not have any child nodes, the values 0100 and 0101 of the node indices for those two missing child nodes are not repeated as values for node indices of other nodes of BVH tree 60. Instead, nodes 62 are indexed as if BVH tree 60 is a complete binary tree. Thus, node 62D may be associated with a node index having a value of 0110, and node 62E may be associated with a node index having a value of 0111.

GPU 12 may traverse BVH tree 60 to determine whether a ray intersects one or more primitives of primitive 52 and, if so, which primitives of primitives 52 are intersected by the ray by performing ray-box intersection tests for the bounding volumes 56 associated with nodes 62 of BVH tree 60 and by performing ray-primitive intersection tests for one or more of primitives 52. GPU 12 may start traversal of BVH tree 60 by performing a ray-box intersection test for bounding volume 56A associated with root node 62A. If GPU 12 determines that the ray intersects bounding volume 56A, GPU 12 may continue to traverse BVH tree 60 to node 62B, and GPU 12 may perform a ray-box intersection test for bounding volume 56B associated with node 62B. If GPU 12 determines that the ray does not intersect bounding volume 56B, GPU 12 may recursively traverse BVH tree up to node 62A and down to node 62C, and GPU 12 may perform a ray-box intersection test for bounding volume 56C associated with node 62C. If GPU 12 determines that the ray intersects bounding volume 56C, GPU 12 may continue to traverse BVH tree 60 to node 62D, and GPU 12 may perform a ray-box intersection test for bounding volume 56D associated with node 62D. If GPU 12 determines that the ray intersects bounding volume 56D, GPU 12 may perform a ray-primitive intersection tests for primitives linked to node 62D. Therefore, GPU 12 may perform a ray-primitive intersection test for primitive 52C and may also perform a ray-primitive intersection test for primitive 52D to determine whether the ray intersects primitive 52C or primitive 52D. GPU 12 may determine from the ray-primitive intersection test for primitive 52D that the ray does intersect primitive 52D. If the ray is a shadow ray, upon determining that the ray does intersect a primitive (e.g., primitive 52D), GPU 12 may determine the location in graphics scene 50 from which the shadow ray originates is occluded from the light source.

If GPU 12 determines that the ray does not intersect primitive 52D, or if the ray is not a shadow ray, GPU 12 may continue to recursively traverse BVH tree 60 up to node 62C and down to 62E, and GPU 12 may perform a ray-box intersection test for bounding volume 56E associated with node 62E. GPU 12 may determine, based on the ray-box intersection test, whether the ray intersects bounding volume 56E and, upon making the determination, may end traversal of BVH tree 60 for the ray.

If BVH tree 60 can be traversed starting from a non-root node, such as from one of interior node 62C or leaf nodes 62B, 62D, and 62E, GPU 12 may reduce the number of ray intersection tests that it performs relative to starting traversal of BVH tree 60 from root node 62A, thereby increasing the efficiency of determining one or more primitives that are intersected by a ray. GPU 12 may start traversal of BVH tree 60 from a non-root node of BVH tree 60 by determining that a bounded volume associated with a non-root (interior) node of BVH tree 60 is intersected by the particular ray. GPU 12 may rasterize representations of at least a subset of bounded volumes 56 to an off-screen render target in graphics memory 40. GPU 12 may determine, based on rasterizing the representations of the plurality of bounding volumes 56 to the off-screen render target, a non-root node of BVH tree 60 as a start node in BVH tree 60 to start traversal of BVH tree 60. GPU 12 may traverse BVH tree 60 starting from the start node to determine the primitive that is intersected by the ray.

Figure 8:
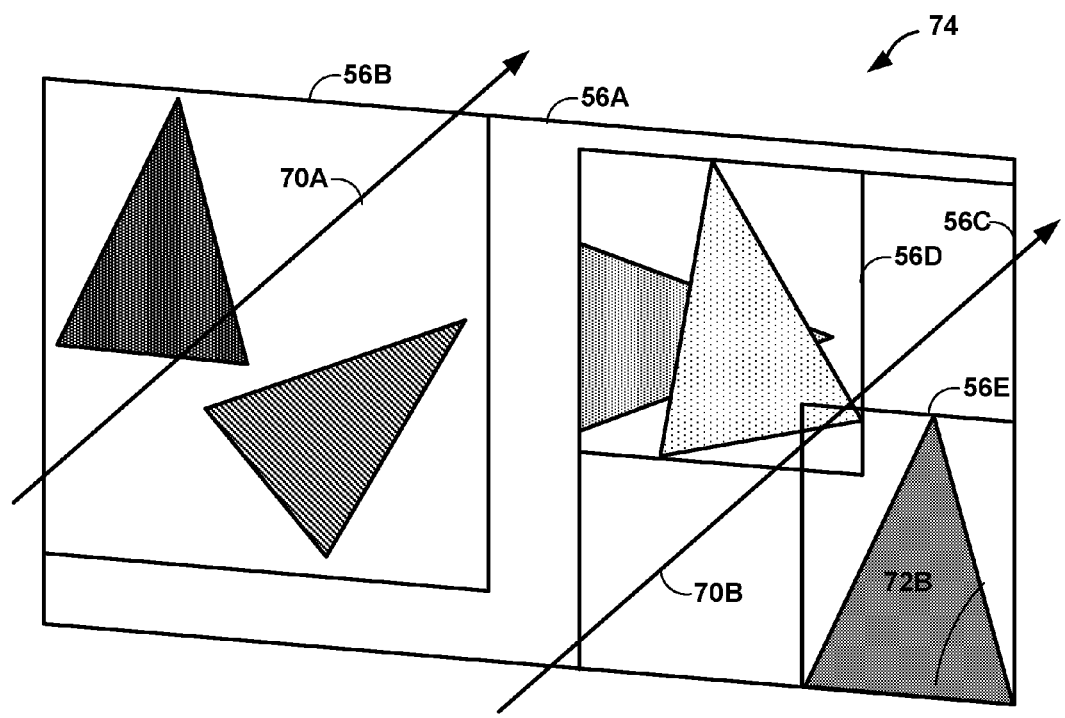
FIG. 8 is a conceptual diagram illustrating an example graphics scene rendered from an example perspective.

GPU 12 may render a two-dimensional representation of graphics scene 50 from the point of view of a viewpoint (e.g., camera or eye) that is viewing graphics scene 50 or, in the case of shadow rendering, GPU 12 may render a two-dimensional representation of the graphics scene 50 from the point of view of a light source for graphics scene 50. FIG. 8 is a conceptual diagram illustrating an example of graphics scene 50 rendered from an example perspective. As shown in FIG. 8, GPU 12 may render two-dimensional representation 74 of graphics scene 50.

GPU 12 may render two-dimensional representation 74 of graphics scene 50 by rasterizing a plurality of pixels to frame buffer 16 for display by display 8 to represent the primitives of graphics scene 50 that are viewable from the particular viewpoint. To determine the pixel values of each pixel making up two-dimensional representation 74 of graphics scene 50, GPU 12 may cast a ray from the viewpoint of graphics scene 50 through each pixel making up two-dimensional representation 74, and determine whether each ray intersects with one or more of primitives 52 in graphics scene 50, such as by traversing BVH tree 60 as discussed above.

If GPU 12 determines that, for a particular pixel location of two-dimensional representation 74 of graphics scene 50, that the corresponding ray intersects one or more of primitives 52, GPU 12 may set the pixel values of the particular pixel location based at least in part on the one or more of primitives 52 intersected by the ray. For example, GPU 12 may set the color value, the alpha value, and/or the like of the pixel location to a color value or an alpha value that represents the intersected primitive of graphics scene 50 that is closest to the viewpoint of two-dimensional representation 74 of graphics scene 50 from which the ray was cast by GPU 12. In this way, GPU 12 may render two-dimensional representation 74 of graphics scene 50.

However, BVH trees can be many multiple levels deep. For example, if a BVH tree includes 16 levels, GPU 12 may be able to more efficiently determine primitives that are intersected by a ray by starting traversal of the BVH tree from a non-root node of the BVH tree instead of starting from the root of the BVH tree. Because GPU 12 may use pixel shader programs and/or vertex shader programs running on processor cluster 46 to quickly rasterize pixels to an off-screen render target and to quickly sample pixels in the off-screen render target, GPU 12 may take advantage of the performance characteristics of these shader programs to determine non-root nodes from which to start traversal of a BVH tree.

Figure 9:
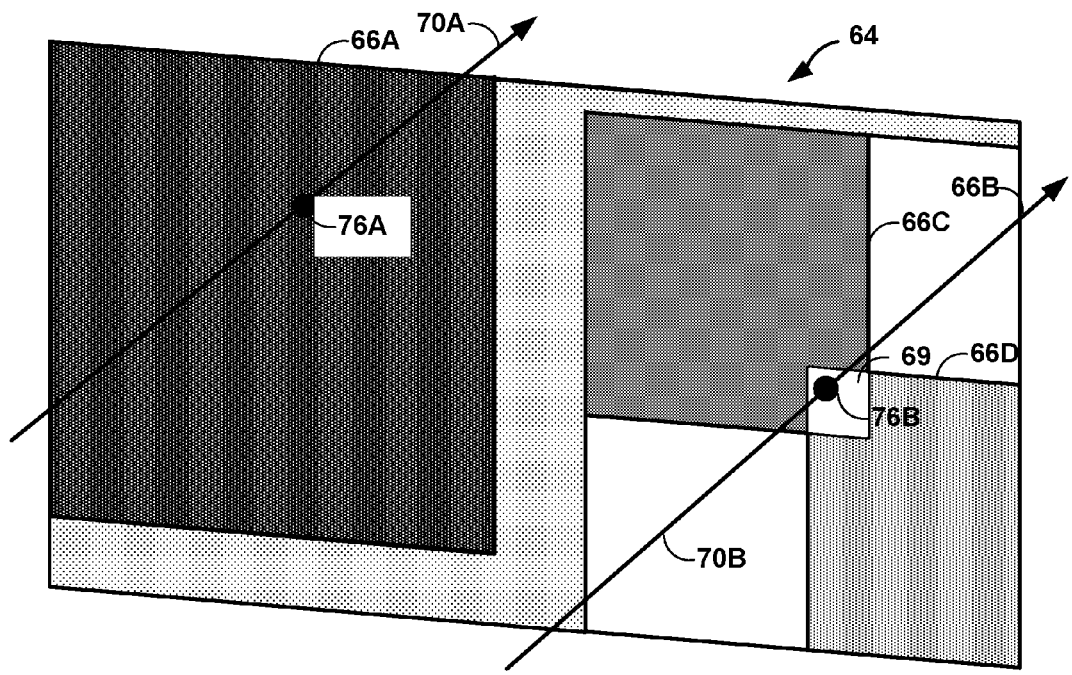
FIG. 9 is a conceptual diagram illustrating an example representation of bounding volumes rasterized to an example off-screen render target.

FIG. 9 is a conceptual diagram illustrating an example representation of bounding volumes rasterized to an example off-screen render target. GPU 12 may, for a specified number of top levels of a BVH tree, use a pixel shader and/or a vertex shader of its graphics processing pipeline executing on processor cluster 46 as well as ROP 48 executing on processor cluster 46 to rasterize representations of bounding volumes associated with the nodes of a BVH tree to an off-screen render target in graphics memory or system memory 10. In some examples, GPU 12 may rasterize only specified top levels of the BVH tree to the off-screen render target, such that given a 16-level BVH tree, GPU 12 may rasterize a representation of bounding volumes associated with only the top 5-6 levels of the BVH tree. Thus, GPU 12 may, in some examples, rasterize representations of bounding volumes associated with fewer than all of the non-root nodes of the BVH tree to off-screen render target 64.

As shown in FIG. 9, GPU 12 may render representations 66A-66D ("representations 66") of bounding volumes 56B-56E of graphics scene 50 associated with nodes 62B-62E of BVH tree 60 to off-screen render target 64 from the same perspective as an eye, camera, or other viewpoint viewing two-dimensional representation 74 of graphics scene 50. GPU 12 may store off-screen render target 64 in graphics memory 40, system memory 10, or any other suitable memory.

GPU 12 may project bounding volumes 56B-56E from the perspective of a particular viewpoint from which GPU 12 intends to render two-dimensional representation 74 of graphics scene. Programmable processing units 42 and/or fixed function processing units 44 of processor cluster 46 of GPU 12 may perform a simplified version of the graphics processing pipeline to rasterize representations of bounding volumes 56B-56E associated with the non-root nodes 62B-62E of BVH tree 60 as two-dimensional or three-dimensional representations, such as polygons, cubes, and the like to off-screen render target 64. For example, a hardware rasterizer of GPU 12 may scan-covert each of bounding volumes 56 from the same viewpoint as two-dimensional representation 74 of graphics scene 50 of FIG. 5 into pixels in render target 64, such that representations 66 are rasterized with an orthographic matrix with a perspective similar to two-dimensional representation 74 of graphics scene 50.

In one example, GPU 12 may rasterize a plurality of flat shaded cubes to off-screen render target 64 as representations 66 of bounding volumes 56B-56E. GPU 12 may also scale and translate each of the representations 66 to match the shape of the respective bounding volume as from the same viewpoint as two-dimensional representation 74 of graphics scene 50. For example, if bounding volumes 56B-56E are three-dimensional cubes that have been translated according to an orthogonal matrix, GPU 12 may similarly rasterize representations 66 of those bounding volumes 56B-56E as flat shaded and translated cubes to match the shape of the respective bounding volumes 56B-56E. In some examples, GPU 12 may rasterize representations 66 of bounding volumes 56B-56E in relatively lower resolution compared to bounding volumes 56B-56E in transformed scene 74. In this way, GPU 12 may further increase its performance in determining ray-primitive intersections.

GPU 12 may associate a different pixel value, such as color values, alpha values, and the like, with each of the nodes 62 of BVH tree 60. For example, each of the nodes 62 of BVH tree 60 may have an associated node index, and GPU 12 may associate each node index with a different color value. GPU 12 may, for each bounding volume of bounding volumes 56, rasterize the associated representation of the bounding volume of representations 66 as a block of pixels having a color value associated with a node of BVH tree 60 that is associated with the respective bounding volume. In this way, GPU 12 may rasterize each of the representations 66 of bounding volumes 56B-56E in a different color, so that the color value of each of the representations 66 may represent a node index that indicates the associated node in BVH tree 60.

GPU 12 may determine the color of representations 66 by performing standard depth testing of the projected bounding volumes 56B-56E and by assigning different color values to pixels of representations 66 to represent different nodes that are associated with projected bounding volumes 56B-56E. GPU 12 may thus associate the color values assigned to the pixels of representations 66 with nodes 62 of BVH tree 60 and node indices associated with nodes 62. In this way, GPU 12 may determine a node in BVH tree 60 associated with a pixel in render target 64 by sampling the color value of the pixel and determining the node in BVH tree 60 that is associated with the sampled color value.

As part of rasterizing representations 66 to render target 64, GPU 12 may cast rays from the viewpoint of render target 64 through pixels of render target to determine which of representations 66 is intersected by a particular ray. GPU 12 may determine a mapping of rays to pixels in render target 64, so that, for a pixel in render target 64, GPU 12 may map the pixel with one or more rays, such as ray 70A or ray 70B, that may intersect the pixel. In some examples, render target 64 may have a one-to-one mapping between a pixel and a ray. In other examples, if representations 66 are rasterized at a relatively lower resolution (compared to the resolution of corresponding bounding volumes 56) to render target 64, a pixel may be mapped to multiple rays.

To determine potential ray-primitive intersections, GPU 12 may determine a pixel location in render target 64 that map to a ray, such that each ray may map to a pixel location in render target 64. For example GPU 12 may, in render target 64, cast a ray from a particular location. For a pixel location of render target 64 that maps to a particular ray, GPU 12 may sample the color value of the pixel and determine whether a node in BVH tree 60 is associated with the same color value as the pixel. If BVH tree 60 includes a node that is associated with the same color value as the color value of the sampled pixel, GPU 12 may set that node as the start node to start traversal of BVH tree 60 in determining possible ray-primitive intersections for that ray.

In the example of FIG. 9, GPU 12 may determine that pixel 76A is a pixel in render target 64 that is mapped to ray 70A, because pixel 76A is intersected by ray 70A. GPU 12 may sample pixel 76A in render target 64 to determine the color value of pixel 76A, determine that the sampled color value of pixel 76A is the same as the color value associated with a node index for node 62B, and may thereby determine that pixel 76A with node 62B. Thus, GPU 12 may set node 62B as the start node for traversing BVH tree 60 and may start traversal of BVH tree 60 from node 62B.

As GPU 12 traverses BVH tree 60 starting from node 62B, GPU 12 may first perform a ray-box intersection test for bounding volume 56B associated with node 62B. If GPU 12 determines that ray 70A intersects bounding volume 56B, GPU 12 may perform a ray-primitive intersection test for primitive 52A that is linked to node 62D. If GPU 12 determines that ray 70A does not intersect primitive 52A, GPU 12 may recursively traverse BVH tree 60 up to node 62B and may perform a ray-primitive intersection test for primitive 52B linked to node 62B. GPU 12 may determine from the ray-primitive intersection test for primitive 52B that ray 70A does not intersect primitive 52B. Because GPU 12 starts traversal of BVH tree 60 from interior node 62B and determines ray 70A does not intersect with either primitives 52A or 52B, GPU 12 may end the traversal of BVH tree 60 for ray 70A. As can be seen, the traversal of BVH tree 60 to determine one or more of primitives 52 that may intersect ray 70A may include performing relatively fewer ray-box intersection tests as opposed to if GPU 12 started traversal of BVH tree 60 starting from the root node.

GPU 12 may cast a ray through each pixel of render target 64. GPU 12 may render two-dimensional representation 74 of graphics scene 50 to frame buffer 16 for display by display 8. GPU 12 may update the pixel value of the corresponding pixel based at least in part on whether the ray intersects a primitive of primitives 52. If so, GPU 12 may update the pixel value to correspond to the intersected primitive, such as by updating the color value, alpha value, and the like, so that the particular pixel in the finally-rendered two-dimensional representation 74 of graphics scene 50 represents the intersected primitive.

In some examples, depending on the point of view in which graphics scene 50 is rendered as transformed graphics scene 74, representations of bounding volumes of any two nodes may overlap when projected on screen, even though the two nodes do not have a parent-child relationship. In this case, GPU 12 may determine the lowest common ancestor node of the two nodes associated with the overlapping bounding volumes, and GPU 12 may start the traversal of BVH tree 60 from the lowest common ancestor node of the two overlapping bounding volumes. If two representations of bounding volumes overlap, and if a ray intersects in the overlapped region of the two bounding volumes, GPU 12 may determine the lowest common ancestor node of the nodes associated with the bounding volumes and may start traversal of BVH tree 60 from the lowest common ancestor node of the nodes associated with the bounding volumes represented by the two overlapping representations.

If GPU 12 determines that representation 66C and representation 66D overlap in area 69, where representation 66C is associated with node 62D and representation 66D is associated with node 62E, and where node 62D and node 62E are at the same level in BVH tree 60, GPU 12 may determine the pixel value associated with the lowest common ancestor node of nodes 62D and 62E and may set the pixel value of the pixels in area 69 (i.e., the region of overlap) to the same pixel value, such as the color value, associated with the lowest common ancestor node of nodes 62D and 62E. In this example, GPU 12 may determine that node 62C is the lowest common ancestor node of nodes 62D and 62E and may set the color value of the pixels in area 69 to the color value of representation 66B that is associated with node 62C.

If GPU 12 determines that the location where ray 70A intersects bounding volume 56A maps to pixel 76B that lies within area 69 in render target 64, GPU 12 may determine to start traversal of BVH tree 60 from the node 62C by sampling the color of mapped pixel 76B and determining that the color value of the sample pixel is the same as the color value associated with node 62C. Because node 62C is associated with bounding volume 56C represented by representation 66B in render target 64, GPU 12 may perform a ray-box intersection test for bounding volume 56C associated with node 62C. If GPU 12 determines that ray 70B intersects bounding volume 56C, GPU 12 may traverse BVH tree 60 to node 62D. GPU 12 may perform a ray-box intersection test for bounding volume 56D associated with node 62D. If GPU determines that ray 70B intersects bounding volume 56D, GPU 12 may perform a ray-primitive intersection test for primitive 52C linked to node 62D. If GPU determines that ray 70B does not intersect primitive 52C, GPU 12 may recursively traverse BVH tree 60 up to node 62D and may perform a ray-primitive intersection test for primitive 52D linked to node 62D. GPU 12 may determine from the ray-primitive intersection test for primitive 52D that ray 70B does intersect primitive 52D. As can be seen, GPU 12 may accelerate the traversal of BVH tree 60 by rendering a representation of graphics scene 50 into render target 64, and sampling pixels from render target 64 to determine a non-root node from which to begin traversal of BVH tree 60.

In the example of FIG. 9, GPU 12 may rasterize representations 66 of bounding volumes 56B-56E to render target 64 by traversing nodes 62B-62E of BVH tree 60 depth first in a pre-order fashion and rasterizing representations 66 of bounding volumes 56B-56E in that traversal order. Thus, GPU 12 may first rasterize representation 66A by writing a block of pixels having color values associated with node 62B into render target 64, then rasterize representation 66B by writing a block of pixels having color values associated with node 62C into render target 64, then rasterize representation 66C by writing a block of pixels having color values associated with node 62D into render target 64, and then rasterize representation 66D by writing a block of pixels having color values associated with node 62E into render target 64.

Rasterizing representations 66 in this fashion may yield erroneous results with respect to areas, such as area 69, where representations of bounding volumes associated with nodes that are not in parent-child relationships may overlap. In the example of FIG. 6, as discussed above, pixels in area 69 should have a color value associated with node 62C, which is the lowest common ancestor node of nodes 62D and 62E. However, as GPU 12 rasterizes representation 66C, GPU 12 first writes color values associated with node 62D into the pixels in area 69. Subsequently, as GPU 12 rasterizes representation 66D, GPU 12 may overwrite the color values of the pixels in area 69 with color values associated with node 62E, because the block of pixels making up representation 66C overlaps the block of pixels making up representation 66D within the block of pixels making up area 69. This yields an incorrect color value for pixels in area 69 because the color values of the pixels in area 69 are set to the color values for node 62E instead of node 62C.

Accordingly, GPU 12 may include ROP 48, which may operate in an LCA mode to receive indications of two nodes of a tree, and may output an indication of the two nodes' lowest common ancestor node in the tree. ROP 48 may be useful in more efficiently rasterizing pixels in areas of render target 64, such as area 69, where representations of bounding volumes associated with nodes that are not in a parent-child relationship may overlap.

In one example, as part of performing a simplified graphics processing pipeline to rasterize representations 66 of bounding volumes 56 to render target 64, the pixel shader running on GPU 12 may output to ROP 48 the pixel value of a particular pixel location in render target 64 that GPU 12 is to write to. The pixel value may specify a color value to be written for the particular pixel location, where the color value may be associated with a source node of node 62 in BVH tree 60. ROP 48 may retrieve the current pixel value of the particular pixel location to which the pixel shader is attempting to write. If the particular pixel location already has a current pixel value, such as a current color value, ROP 48 may determine that GPU 12 has already previously written a pixel value associated with a destination node of node 62 in BVH tree 60 to the particular pixel location, and ROP 48 may determine a pixel value associated with a lowest common ancestor node of the source node and the destination node.

ROP 48 may utilize the techniques described throughout this disclosure to determine the lowest common ancestor node of the source node and the destination node in BVH tree 60, and may determine a resulting pixel value associated with the lowest common ancestor node of the source node and the destination node. Upon determining the resulting pixel value, ROP 48 may output the resulting pixel value to the particular pixel location of render target 64 specified by the pixel shader.

In the example of rasterizing pixel locations in area 69 of render target 64, GPU 12 may first rasterize representation 66B of node 62C to render target 64. As part of rasterizing representation 66B, the pixel shader of GPU 12 may output a pixel value that specifies a color value associated with node 62C to be written to a particular pixel location in area 69 of render target 64. ROP 48 may receive the pixel value outputted from GPU 12 and may attempt to determine the current pixel value of the particular pixel location in render target 64. If GPU 12 had not previously written a pixel value to the particular pixel location, ROP 48 may determine the particular pixel location does not currently have a pixel value, and may set as the pixel value for the particular pixel location as specified by the pixel value received from the pixel shader.

Subsequent to rasterizing representation 66B of node 62C to render target 64, GPU 12 may rasterize representation 66C of node 62D to render target 64. As part of rasterizing representation 66C, the pixel shader of GPU 12 may output a pixel value that specifies a color value associated with node 62D to be written to a particular pixel location in area 69 of render target 64. ROP 48 may receive the pixel value outputted from GPU 12 and may attempt to determine the current pixel value of the particular pixel location in render target 64. Because GPU 12 had previously rasterized representation 66B to areas of render target 64 that includes area 69, GPU 12 may retrieve the current pixel value of the particular pixel location and determine that the current pixel value is associated with node 62C. However, ROP 48 may determine that node 62D is the child node of node 62C associated with representation 66C, and therefore the two nodes do not have a common ancestor node. Thus, ROP 48 may enable GPU 12 to overwrite the pixel value of the particular pixel location in area 69 with the pixel value associated with node 62D, including setting the color value specified by the pixel value received from the pixel shader as the color value of the particular pixel location After rasterizing representation 66C of node 62D to render target 64, GPU 12 may rasterize representation 66D of node 62E to render target 64. As part of rasterizing representation 66D, the pixel shader of GPU 12 may output a pixel value that specifies a color value associated with node 62E to be written to a particular pixel location in area 69 of render target 64. ROP 48 may receive the pixel value outputted from GPU 12 and may attempt to determine the current pixel value of the particular pixel location in render target 64. ROP 48 may retrieve the current pixel value of the particular pixel location and may determine that the current pixel value of the particular pixel location is associated with node 62D.

ROP 48 may determine a color pixel associated with the lowest common ancestor of nodes 62D and 62E. ROP 48 may determine, based on the pixel value specified by the pixel value received from the pixel shader, the node index associated with node 62D. ROP 48 may also determine, based on the current pixel value of the particular pixel location, the node index associated with node 62D. ROP 48 may determine, based at least in part on the two determined node indices and applying the techniques described throughout this disclosure, a node index associated with the lowest common ancestor node of node 62D and node 62E, and may determine that node 62C is the lowest common ancestor node of nodes 62D and 62E. Upon determining node 62C as the lowest common ancestor node of nodes 62D and 62E, ROP 48 may determine the pixel value associated with node 62C and may write the pixel value associated with node 62C to the particular pixel location in area 69 of render target 64.

As can be seen, GPU 12 may, for a pixel to be written to a pixel location in render target 64, output the pixel value from the pixel shader to ROP 48, and ROP 48 may write the correct pixel value for the pixel to the pixel location in render target 64, including correctly writing pixel values that specify the color value associated with lowest common ancestor nodes for pixel locations where two representations of nodes that are not in a parent-child relationship overlap. In this way, GPU 12 may be able to rasterize representations 66 of nodes 62D to render target 64 in a single pass by inputting into ROP 48 indications of two nodes and receiving as output an indication of the lowest common ancestor node of the two nodes.

Figure 10:
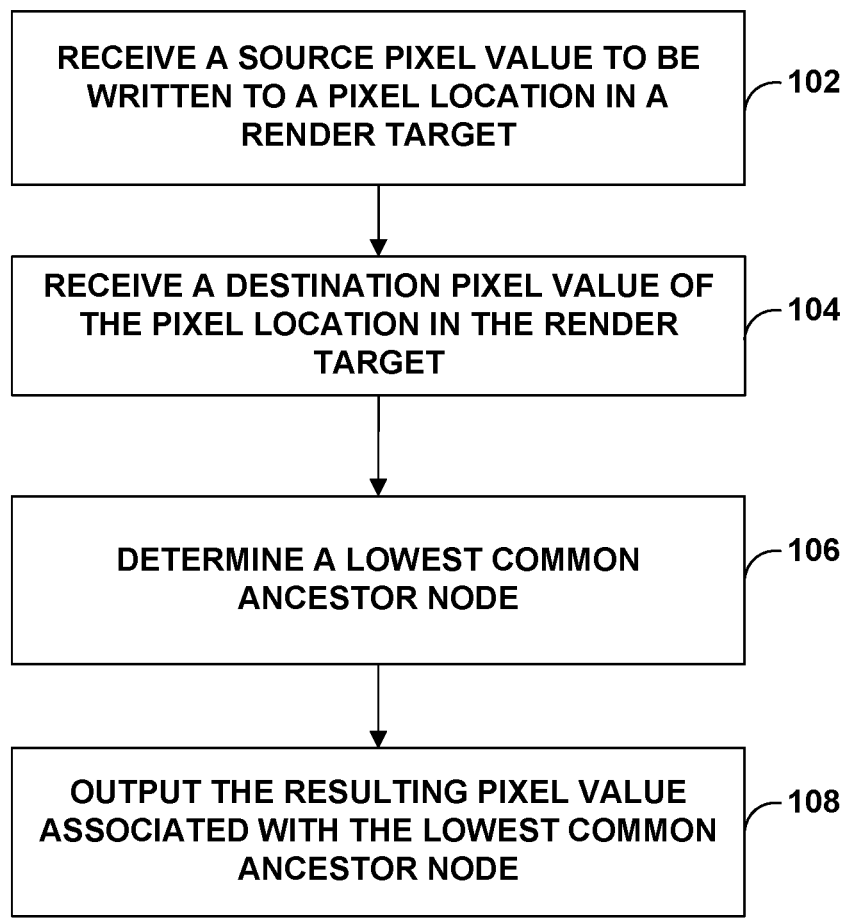
FIG. 10 is a flowchart illustrating an example process for determining the least common ancestor node of two nodes in a hierarchical structure.

FIG. 10 is a flowchart illustrating an example process for determining the least common ancestor node of two nodes in a hierarchical structure. As shown in FIG. 10, the process may include receiving, by a render output unit 48 of a processor 12, a source pixel value to be written to a pixel location in a render target 64, wherein the source pixel value is associated with a source node in a hierarchical structure (102). The process may further include receiving, by the render output unit 48 of the processor 12, a destination pixel value of the pixel location in the render target 64, wherein the destination pixel value is associated with a destination node in the hierarchical structure (104). The process may further include determining, by the render output unit 48 of the processor 12, a lowest common ancestor node of the source node and the destination node in the hierarchical structure (106). The process may further include outputting, by the render output unit 48 of the processor 12, a resulting pixel value associated with the lowest common ancestor node of the source node and the destination node to the pixel location in the render target 64 (108).

In some examples, the hierarchical structure includes a binary tree having a plurality of nodes, and the plurality of nodes are associated with a plurality of node indices. The process may further include determining, by the render output unit 48 of the processor 12 and based at least in part on the source pixel value, a source node index associated with the source node, determining, by the render output unit 48 of the processor 12 and based at least in part on the destination pixel value, a destination node index associated with the destination node, and determining, by the render output unit 48 of the processor 12 and based at least in part on the source node index and the destination node index, a resulting node index associated with the lowest common ancestor node of the source node and the destination node.

In some examples, determining the resulting node index may further include aligning, by the render output unit 48 of the processor 12, a first set of bits that make up the source node index and a second set of bits that make up the destination node index under a highest set bit of each of the first set of bits and the second set of bits by right-shifting the greater of the first set of bits and the second set of bits. In some examples, the process may further include determining, by the render output unit 48 of the processor 12, the resulting node index as being made up of a set of consecutive common bits between the aligned first set of bits and second set of bits, starting from the highest set bit as a third set of bits associated with the lowest common ancestor node.

In some examples, aligning the first set of bits and the second set of bits may further include left-aligning, by the render output unit 48 of the processor 12, the first set of bits that make up the source node index and a second set of bits that make up the destination node index, by left-shifting one or more of the first set of bits and the second set of bits, such that a respective highest bit the left-aligned first set of bits and the left-aligned second set of bits are each set, and may further include determining, by the render output unit 48 of the processor 12, the resulting node index as being made up of a set of consecutive common bits between the aligned first set of bits and second set of bits, starting from the highest set bit as a third set of bits associated with the lowest common ancestor node.

In some examples, the process may further include bounding, by the processor 12, a plurality of primitives 52 of a scene 50 into a plurality of bounding volumes 56. The process may further include organizing, by the processor 12, the plurality of bounding volumes 56 in the hierarchical structure 60, wherein a plurality of nodes 62 of the hierarchical structure 60 are associated with the plurality of bounding volumes 56. The process may further include rasterizing, by the processor 12, representations 66 of one or more of the bounding volumes 56 to the render target 64, including: rasterizing a representation of a first bounding volume to a first set of pixel locations in the render target 64, and rasterizing a representation of a second bounding volume to a second set of pixel locations in the render target 64, wherein the first set of pixel locations and the second set of pixel locations both include the pixel location in the render target 64.

In some examples, the process may further include mapping, by the processor 12, a ray to one or more pixels of the render target 64. The process may further include determining, by the processor 12 and based at least in part the one or more pixels of the render target 64 mapped to the ray including the pixel location, a non-root node of the hierarchical data structure 60 associated with the resulting pixel value of the pixel location as a start node to start traversal of the hierarchical data structure 60. The process may further include traversing, by the processor 12, a set of nodes of the hierarchical data structure 60 starting from the start node to determine one or more intersections between the ray and one or more of the plurality of primitives 52.

In some examples, the process may further include updating, by the processor 12, one or more pixel values for one or more locations of the scene 50 based at least in part on determining the one or more intersections between the ray and the one or more of the plurality of primitives, and rendering, by the processor 12, the scene 50 based at least in part on the one or more color values for the one or more locations of the scene for display by a display device 8.

In some examples, the source pixel value comprises a source color value, the destination pixel value comprises a destination color value, and the resulting pixel value comprises a resulting color value.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" and "processing unit," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:
1. A method for graphics processing, comprising:
receiving, by at least one processor, a source pixel value to be written to a pixel location in a render target, wherein the source pixel value is associated with a source node in a hierarchical structure having a plurality of nodes associated with a plurality of node indices, and wherein the source node is associated with a source node index made up of a first set of bits;
receiving, by the at least one processor, a destination pixel value of the pixel location in the render target, wherein the destination pixel value is associated with a destination node in the hierarchical structure, and wherein the destination node is associated with a destination node index made up of a second set of bits;

determining, by the at least one processor, a lowest common ancestor node of the source node and the destination node in the hierarchical structure, including determining a resulting node index associated with the lowest common ancestor node based at least in part on a common set of bits between the first set of bits and the second set of bits; and outputting, by the at least one processor, a resulting pixel value associated with the lowest common ancestor node of the source node and the destination node to the pixel location in the render target.

2. The method of claim 1, wherein the hierarchical structure includes a binary tree, the method further comprising:

determining, by the at least one processor and based at least in part on the source pixel value, the source node index associated with the source node; and determining, by the at least one processor and based at least in part on the destination pixel value, the destination node index associated with the destination node.

3. The method of claim 2, wherein determining the resulting node index further comprises:

aligning, by the at least one processor, the first set of bits that make up the source node index and the second set of bits that make up the destination node index under a highest set bit of each of the first set of bits and the second set of bits by right-shifting the greater of the first set of bits and the second set of bits; and determining, by the at least one processor, the resulting node index as being made up of a set of consecutive common bits between the aligned first set of bits and second set of bits, starting from the highest set bit, as a third set of bits associated with the lowest common ancestor node.

4. The method of claim 3, wherein aligning the first set of bits and the second set of bits further comprises:

left-aligning, by the at least one processor, the first set of bits that make up the source node index and a second set of bits that make up the destination node index, by at least left-shifting one or more of the first set of bits and the second set of bits, such that a respective highest bit of the left-aligned first set of bits and the left-aligned second set of bits are each set; and determining, by the at least one processor, the resulting node index as being made up of at least a portion of a set of consecutive common bits between the aligned first set of bits and second set of bits, starting from the highest set bit.

5. The method of claim 1, further comprising:

binding, by the at least one processor, a plurality of primitives of a scene into a plurality of bounding volumes;

organizing, by the at least one processor, the plurality of bounding volumes in the hierarchical structure, wherein a plurality of nodes of the hierarchical structure are associated with the plurality of bounding volumes; and rasterizing, by the at least one processor, representations of one or more of the bounding volumes to the render target, including:

rasterizing, by the at least one processor, a representation of a first bounding volume to a first set of pixel locations in the render target, and rasterizing, by the at least one processor, a representation of a second bounding volume to a second set of pixel locations in the render target, wherein first set of pixel locations and the second set of pixel locations both include the pixel location in the render target.

6. The method of claim 5, further comprising:

mapping, by the at least one processor, a ray to one or more pixels of the render target;

determining, by the at least one processor and based at least in part on the one or more pixels of the render target mapped to the ray, a non-root node of the hierarchical data structure associated with the resulting pixel value of the pixel location as a start node to start traversal of the hierarchical data structure; and traversing, by the at least one processor, a set of nodes of the hierarchical data structure starting from the start node to determine one or more intersections between the ray and one or more of the plurality of primitives.

7. The method of claim 6, further comprising:

updating, by the at least one processor, one or more pixel values for one or more locations of the scene based at least in part on determining the one or more intersections between the ray and the one or more of the plurality of primitives; and rendering, by the at least one processor, the scene based at least in part on the one or more pixel values for the one or more locations of the scene for display by a display device.

8. The method of claim 1, wherein:

the source pixel value specifies a source color value;
the destination pixel value specifies a destination color value; and
the resulting pixel value specifies a resulting color value.

9. An apparatus for graphics processing, comprising:

a memory configured to store a render target;
at least one processor configured to:

receive a source pixel value to be written to a pixel location in the render target, wherein the source pixel value is associated with a source node in a hierarchical structure having a plurality of nodes associated with a plurality of node indices, and wherein the source node is associated with a source node index made up of a first set of bits;

receive a destination pixel value of the pixel location in the render target, wherein the destination pixel value is associated with a destination node in the hierarchical structure, and wherein the destination node is associated with a destination node index made up of a second set of bits;

determine a lowest common ancestor node of the source node and the destination node in the hierarchical structure, including determining a resulting node index associated with the lowest common ancestor node based at least in part on a common set of bits between the first set of bits and the second set of bits; and output a resulting pixel value associated with the lowest common ancestor node of the source node and the destination node to the pixel location in the render target.

10. The apparatus of claim 9, wherein:

the hierarchical structure includes a binary tree; and the at least one processor is further configured to:

determine, based at least in part on the source pixel value, the source node index associated with the source node; and determine, based at least in part on the destination pixel value, the destination node index associated with the destination node.

11. The apparatus of claim 10, wherein the at least one processor is further configured to:
align the first set of bits that make up the source node index and the second set of bits that make up the destination node index under a highest set bit of each of the first set of bits and the second set of bits by right-shifting the greater of the first set of bits and the second set of bits; and
determine the resulting node index as being made up of a set of consecutive common bits between the aligned first set of bits and second set of bits, starting from the highest set bit as a third set of bits associated with the lowest common ancestor node.

12. The apparatus of claim 10, wherein the at least one processor is further configured to:
left-align the first set of bits that make up the source node index and a second set of bits that make up the destination node index, by left-shifting one or more of the first set of bits and the second set of bits, such that a respective highest bit the left-aligned first set of bits and the left-aligned second set of bits are each set; and
determine the resulting node index as being made up of at least a portion of a set of consecutive common bits between the aligned first set of bits and second set of bits, starting from the highest set.

13. The apparatus of claim 9, wherein the at least one processor is further configured to:
bind a plurality of primitive of a scene into a plurality of bounding volumes;
organize the plurality of bounding volumes in the hierarchical structure, wherein a plurality of nodes of the hierarchical structure are associated with the plurality of bounding volumes; and
rasterize representations of one or more of the bounding volumes to the render target, including:
rasterize a representation of a first bounding volume to a first set of pixel locations in the render target, and
rasterize a representation of a second bounding volume to a second set of pixel locations in the render target, wherein first set of pixel locations and the second set of pixel locations both include the pixel location in the render target.

14. The apparatus of claim 13, wherein the at least one processor is further configured to:
map a ray to one or more pixels of the render target;
determine, based at least in part the one or more pixels of the render target mapped to the ray including the pixel location, a non-root node of the hierarchical data structure associated with the resulting pixel value of the pixel location as a start node to start traversal of the hierarchical data structure; and
traversing, by the at least one processor, a set of nodes of the hierarchical data structure starting from the start node to determine one or more intersections between the ray and one or more of the plurality of primitives.

15. The apparatus of claim 14, wherein the at least one processor is further configured to:
update one or more pixel values for one or more locations of the scene based at least in part on determining the one or more intersections between the ray and the one or more of the plurality of primitives; and
render the scene based at least in part on the one or more pixel values for the one or more locations of the scene for display by a display device.

16. The apparatus of claim 9, wherein:
the source pixel value specifies a source color value;
the destination pixel value specifies a destination color value; and
the resulting pixel value specifies a resulting color value.

17. An apparatus for graphics processing, comprising:
means for receiving a source pixel value to be written to a pixel location in a render target, wherein the source pixel value is associated with a source node in a hierarchical structure having a plurality of nodes associated with a plurality of node indices, and wherein the source node is associated with a source node index made up of a first set of bits;
means for receiving a destination pixel value of the pixel location in the render target, wherein the destination pixel value is associated with a destination node in the hierarchical structure, and wherein the destination node is associated with a destination node index made up of a second set of bits;
means for determining a lowest common ancestor node of the source node and the destination node in the hierarchical structure, the means for determining including means for determining a resulting node index associated with the lowest common ancestor node based at least in part on a common set of bits between the first set of bits and the second set of bits; and
means for outputting, by the render output unit of the processor, a resulting pixel value associated with the lowest common ancestor node of the source node and the destination node to the pixel location in the render target.

18. The apparatus of claim 17, wherein the hierarchical structure includes a binary tree, the apparatus further comprising:
means for determining, based at least in part on the source pixel value, the source node index associated with the source node; and
means for determining, based at least in part on the destination pixel value, the destination node index associated with the destination node.

19. The apparatus of claim 18, wherein the means for determining the resulting node index further comprises:
means for aligning the first set of bits that make up the source node index and the second set of bits that make up the destination node index under a highest set bit of each of the first set of bits and the second set of bits by right-shifting the greater of the first set of bits and the second set of bits;
means for determining the resulting node index as being made up of a set of consecutive common bits between the aligned first set of bits and second set of bits, starting from the highest set bit as a third set of bits associated with the lowest common ancestor node.

20. The apparatus of claim 18, wherein the means for aligning the first set of bits and the second set of bits further comprises:
means for left-aligning the first set of bits that make up the source node index and a second set of bits that make up the destination node index, by left-shifting one or more of the first set of bits and the second set of bits, such that a respective highest bit the left-aligned first set of bits and the left-aligned second set of bits are each set; and
means for determining the resulting node index as being made up of at least a portion of a set of consecutive common bits between the aligned first set of bits and second set of bits, starting from the highest set.

21. The apparatus of claim 17, further comprising:
means for binding a plurality of primitive of a scene into a plurality of bounding volumes;
means for organizing the plurality of bounding volumes in the hierarchical structure, wherein a plurality of nodes of the hierarchical structure are associated with the plurality of bounding volumes;
means for rasterizing representations of one or more of the bounding volumes to the render target, including:
means for rasterizing a representation of a first bounding volume to a first set of pixel locations in the render target, and
means for rasterizing a representation of a second bounding volume to a second set of pixel locations in the render target, wherein first set of pixel locations and the second set of pixel locations both include the pixel location in the render target.

22. The apparatus of claim 21, further comprising:
means for mapping a ray to one or more pixels of the render target;
means for determining, based at least in part the one or more pixels of the render target mapped to the ray including the pixel location, a non-root node of the hierarchical data structure associated with the resulting pixel value of the pixel location as a start node to start traversal of the hierarchical data structure; and
means for traversing a set of nodes of the hierarchical data structure starting from the start node to determine one or more intersections between the ray and one or more of the plurality of primitives.

23. The apparatus of claim 17, further comprising:
means for updating one or more pixel values for one or more locations of the scene based at least in part on determining the one or more intersections between the ray and the one or more of the plurality of primitives; and
means for rendering the scene based at least in part on the one or more pixel values for the one or more locations of the scene for display by a display device.

24. A non-transitory computer-readable storage medium storing instructions that, when executed, cause one or more programmable processors to:
receive a source pixel value to be written to a pixel location in a render target, wherein the source pixel value is associated with a source node in a hierarchical structure having a plurality of nodes associated with a plurality of node indices, and wherein the source node is associated with a source node index made up of a first set of bits;
receive a destination pixel value of the pixel location in the render target, wherein the destination pixel value is associated with a destination node in the hierarchical structure, and wherein the destination node is associated with a destination node index made up of a second set of bits;
determine a lowest common ancestor node of the source node and the destination node in the hierarchical structure, including determining a resulting node index associated with the lowest common ancestor node based at least in part on a common set of bits between the first set of bits and the second set of bits; and
output a resulting pixel value associated with the lowest common ancestor node of the source node and the destination node to the pixel location in the render target.

25. The non-transitory computer-readable storage medium of claim 24, wherein the hierarchical structure includes a binary tree, and further comprising instructions that, when executed, cause one or more programmable processors to:
determine, based at least in part on the source pixel value, the source node index associated with the source node; and
determine, based at least in part on the destination pixel value, the destination node index associated with the destination node.

26. The non-transitory computer-readable storage medium of claim 25, further comprising instructions that, when executed, cause one or more programmable processors to:
align the first set of bits that make up the source node index and the second set of bits that make up the destination node index under a highest set bit of each of the first set of bits and the second set of bits by right-shifting the greater of the first set of bits and the second set of bits; and
determine the resulting node index as being made up of a set of consecutive common bits between the aligned first set of bits and second set of bits, starting from the highest set bit as a third set of bits associated with the lowest common ancestor node.

27. The non-transitory computer-readable storage medium of 25, further comprising instructions that, when executed, cause one or more programmable processors to:
left-align the first set of bits that make up the source node index and a second set of bits that make up the destination node index, by left-shifting one or more of the first set of bits and the second set of bits, such that a respective highest bit the left-aligned first set of bits and the left-aligned second set of bits are each set; and
determine the resulting node index as being made up of at least a portion of a set of consecutive common bits between the aligned first set of bits and second set of bits, starting from the highest set.

28. The non-transitory computer-readable storage medium of claim 24, further comprising instructions that, when executed, cause one or more programmable processors to:
bind a plurality of primitive of a scene into a plurality of bounding volumes;
organize the plurality of bounding volumes in the hierarchical structure, wherein a plurality of nodes of the hierarchical structure are associated with the plurality of bounding volumes; and
rasterize representations of one or more of the bounding volumes to the render target, including:
rasterize a representation of a first bounding volume to a first set of pixel locations in the render target, and
rasterize a representation of a second bounding volume to a second set of pixel locations in the render target, wherein first set of pixel locations and the second set of pixel locations both include the pixel location in the render target.

29. The non-transitory computer-readable storage medium of claim 28, further comprising instructions that, when executed, cause one or more programmable processors to:
map a ray to one or more pixels of the render target;
determine, based at least in part the one or more pixels of the render target mapped to the ray including the pixel location, a non-root node of the hierarchical data structure associated with the resulting pixel value of the pixel location as a start node to start traversal of the hierarchical data structure; and traversing, by the at least one processor, a set of nodes of the hierarchical data structure starting from the start node to determine one or more intersections between the ray and one or more of the plurality of primitives.

30. The non-transitory computer-readable storage medium of claim 29, further comprising instructions that, when executed, cause one or more programmable processors to:
- update one or more pixel values for one or more locations of the scene based at least in part on determining the one or more intersections between the ray and the one or more of the plurality of primitives; and
- render the scene based at least in part on the one or more pixel values for the one or more locations of the scene for display by a display device.

* * * * *